US012742889B2

(12) United States Patent
Lim

(10) Patent No.: US 12,742,889 B2
(45) Date of Patent: Sep. 22, 2026

(54) METHOD AND APPARATUS FOR GENERATING SATELLITE NAVIGATION SIGNALS

(71) Applicant: Electronics and Telecommunications Research Institute, Daejeon (KR)

(72) Inventor: Hyoung Soo Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 232 days.

(21) Appl. No.: 18/676,392

(22) Filed: May 28, 2024

(65) Prior Publication Data

US 2024/0402355 A1 Dec. 5, 2024

(30) Foreign Application Priority Data

May 30, 2023 (KR) ........................ 10-2023-0069162

(51) Int. Cl.
*G01S 19/24* (2010.01)
*G01S 19/25* (2010.01)
*G01S 19/42* (2010.01)

(52) U.S. Cl.
CPC .......... *G01S 19/256* (2013.01); *G01S 19/426* (2013.01)

(58) Field of Classification Search
CPC ............................. G01S 19/246; G01S 19/426
USPC ..................................................... 342/357.64
See application file for complete search history.

(56) References Cited

U.S. PATENT DOCUMENTS

| | | | |
|---|---|---|---|
| 9,482,760 B2 | 11/2016 | Lennen | |
| 9,680,594 B2 | 6/2017 | Yao et al. | |
| 10,075,312 B2 | 9/2018 | Jeng et al. | |
| 2014/0028499 A1 | 1/2014 | Yeh et al. | |
| 2021/0126726 A1 | 4/2021 | Parkvall et al. | |
| 2022/0200828 A1 | 6/2022 | Lee et al. | |
| 2022/0299654 A1 | 9/2022 | Lee et al. | |
| 2022/0330041 A1 | 10/2022 | Lee et al. | |
| 2022/0404510 A1 | 12/2022 | Kim | |
| 2024/0219579 A1* | 7/2024 | Shen | G01S 19/32 |

FOREIGN PATENT DOCUMENTS

| | | | |
|---|---|---|---|
| CN | 107300709 A * | 10/2017 | G01S 19/29 |
| CN | 115856960 A * | 3/2023 | |
| EP | 3537181 A1 * | 9/2019 | G01S 19/24 |
| JP | 2017139705 A * | 8/2017 | |
| WO | WO-2023158506 A1 * | 8/2023 | H04B 1/10 |

OTHER PUBLICATIONS

Yao, Zheng et al. "ACE-BOC: Dual-Frequency Constant Envelope Multiplexing for Satellite Navigation," DOI. No. 10.1109/TAES. 2015.140607. IEEE Transactions on Aerospace and Electronic Systems. Feb. 2016.

* cited by examiner

*Primary Examiner* — Vladimir Magloire
(74) *Attorney, Agent, or Firm* — BROADVIEW IP LAW, PC

(57) ABSTRACT

A method of a satellite navigation signal generation device may comprise: receiving a plurality of signals; assigning carrier frequency offset(s) to at least one pair of signals among the plurality of signals; and generating a constant envelope multiplexed signal for the plurality of signals including the at least one pair of signals to which the carrier frequency offset(s) are assigned.

16 Claims, 27 Drawing Sheets

920
signal #1
signal #2
910
. . .
first sign inversion pattern signal or third sign inversion pattern signal
912
signal #N-1
911
sample switch
signal #N
second sign inversion pattern signal or fourth sign inversion pattern signal
913
constant envelope multiplexed signal

1120 signal #1 signal #2

1110

. . .

1111 first sign inversion pattern signal or third sign inversion pattern signal signal #N-1

1113 sample switch signal #N

1112 second sign inversion pattern signal or fourth sign inversion pattern signal constant envelope multiplexed signal

METHOD AND APPARATUS FOR GENERATING SATELLITE NAVIGATION SIGNALS

CROSS-REFERENCE TO RELATED APPLICATIONS

This application claims priority to Korean Patent Application No. 10-2023-0069162, filed on May 30, 2023, with the Korean Intellectual Property Office (KIPO), the entire contents of which are hereby incorporated by reference.

BACKGROUND

1. Technical Field

The present disclosure relates to a technique for generating satellite navigation signals, and more particularly, to a technique for generating satellite navigation signals by selectively applying carrier frequency offset(s) to a pair of quadrature signals while maintaining a constant envelope multiplexing condition.

2. Related Art

The satellite navigation systems are satellite-based systems that provide three-dimensional positioning and time synchronization information through distance measurement using radio waves and position information of satellites received from a constellation of multiple satellites in Earth's orbits. The navigation satellites of the satellite navigation systems can transmit several satellite navigation signals on the same carrier in order to provide users with positioning, navigation, and timing services for various purposes.

For this purpose, several satellite navigation signals can be multiplexed and share the same carrier. Accordingly, frequency spectrum efficiency can be improved. However, the power magnitude of the multiplexed signal may not be constant at every moment at an input terminal of a power amplifier. As a result, spectrum distortion may occur due to the nonlinearity of a high-power amplifier (HPA). To prevent this, the navigation satellites can use a constant envelope multiplexing technique that guarantees constant envelope (CE) characteristics of the multiplexed signal.

Meanwhile, in a satellite navigation system, the power spectral density (PSD) of signals in each frequency band may have a symmetrical form based on the center frequency of the frequency band in use. However, the frequency bands used by satellite navigation systems may not be the same. Accordingly, interference between satellite navigation systems may have asymmetric characteristics. Considering the above-described asymmetric interference characteristics, a satellite navigation system may allow a new satellite navigation signal to be additionally transmitted in the same frequency band to have an asymmetric spectrum. To achieve this, the satellite navigation system may apply an offset to the center frequency of some signals among those to be transmitted in one frequency band. However, in this case, the complexity of implementing a signal generator may increase, and it may be difficult to design constant envelope multiplexing.

SUMMARY

The present disclosure for resolving the above-described problems is directed to providing a method and an apparatus for generating satellite navigation signals by selectively applying carrier frequency offset(s) to a pair of quadrature signals while maintaining a constant envelope multiplexing condition.

According to a first exemplary embodiment of the present disclosure, a method of a satellite navigation signal generation device may comprise: receiving a plurality of signals; assigning carrier frequency offset(s) to at least one pair of signals among the plurality of signals; and generating a constant envelope multiplexed signal for the plurality of signals including the at least one pair of signals to which the carrier frequency offset(s) are assigned.

The at least one pair of signals may include a first signal and a second signal, the first signal and the second signal being quadrature signals with each other.

In the assigning of the carrier frequency offset(s), the carrier frequency offset(s) may be assigned on a sample period basis.

The carrier frequency offset may be $\pm fs/4$ when fs is a sample frequency.

The assigning of the carrier frequency offset(s) may comprise: switching the at least one pair of signals among the plurality of signals between an in-phase channel and a quadrature-phase channel according to a change in a sample period; and sign-inverting the at least one pair of signals switched to the in-phase channel or the quadrature-phase channel.

The switching of the at least one pair of signals may comprise: allowing a sample switch of the satellite navigation signal generation device to output a first signal of the at least one pair of signals from a first input terminal to a first output terminal during each odd-numbered sample period starting from a first sample period; allowing the sample switch to output a second signal of the at least one pair of signals from a second input terminal to a second output terminal during each odd-numbered sample period starting from the first sample period; allowing the sample switch to output the first signal of the at least one pair of signals from the first input terminal to the second output terminal during each even-numbered sample period; and allowing the sample switch to output the second signal of the at least one pair of signals from the second input terminal to the first output terminal during each even-numbered sample period.

The sign-inverting of the at least one pair of signals switched to the in-phase channel or the quadrature-phase channel may comprise: multiplying a first signal from the at least one pair of signals switched to the in-phase channel or the quadrature-phase channel by a first sign inversion pattern or a third sign inversion pattern, and outputting a result; and multiplying a second signal from the at least one pair of signals switched to the in-phase channel or the quadrature-phase channel by a second sign inversion pattern or a fourth sign inversion pattern, and outputting a result.

The first sign inversion pattern signal may sequentially have values of [+1, −1, −1, +1]during respective sample periods from first to fourth sample periods, the second sign inversion pattern signal may sequentially have values of [+1, +1, −1, −1] during the respective sample periods from the first to fourth sample periods, the third sign inversion pattern signal may sequentially have values of [+1, +1, −1, −1] during the respective sample periods from the first to fourth sample periods, and the fourth sign inversion pattern signal may sequentially have values of [+1, −1, −1, +1] during the respective sample periods from the first to fourth sample period.

The assigning of the carrier frequency offset(s) may comprise: sign-inverting the at least one pair of signals; and switching the sign-inverted at least one pair of signals between an in-phase channel and a quadrature-phase channel according to a change in a sample period.

The sign-inverting of the at least one pair of signals may comprise: multiplying a first from the at least one pair of signals by a first sign inversion pattern or a third sign inversion pattern, and outputting a result; and multiplying a second signal of the at least one pair of signals by a second sign inversion pattern or a fourth sign inversion pattern, and outputting a result.

The first sign inversion pattern signal may sequentially have values of [+1, +1, −1, −1] during respective sample periods from first to fourth sample periods, the second sign inversion pattern signal may sequentially have values of [+1, −1, −1, +1] during the respective sample periods from the first to fourth sample periods, the third sign inversion pattern signal may sequentially have values of [+1, −1, −1, +1] during the respective sample periods from the first to fourth sample periods, and the fourth sign inversion pattern signal may sequentially have values of [+1, +1, −1, −1] during the respective sample periods from the first to fourth sample periods.

The switching of the sign-inverted at least one pair of signals between the in-phase phase channel and the quadrature-phase channel according to a change in a sample period may comprise: allowing a sample switch of the satellite navigation signal generation device to output a first signal of the sign-inverted at least one pair of signals from a first input terminal to a first output terminal during each odd-numbered sample period starting from a first sample period; allowing the sample switch to output a second signal of the sign-inverted at least one pair of signals from a second input terminal to a second output terminal during each odd-numbered sample period starting from the first sample period; allowing the sample switch to output the first signal of the sign-inverted at least one pair of signals from the first input terminal to the second output terminal during each even-numbered sample period; and allowing the sample switch to output the second signal of the sign-inverted at least one pair of signals from the second input terminal to the first output terminal during each even-numbered sample period.

According to a second exemplary embodiment of the present disclosure, a device for generating a satellite navigation signal may comprise a processor, and the processor may cause the device to perform: receiving a plurality of signals; assigning carrier frequency offset(s) to at least one pair of signals among the plurality of signals; and generating a constant envelope multiplexed signal for the plurality of signals including the at least one pair of signals to which the carrier frequency offset(s) are assigned.

The at least one pair of signals may include a first signal and a second signal, the first signal and the second signal being quadrature signals with each other.

In the assigning of the carrier frequency offset(s), the carrier frequency offset(s) may be assigned on a sample period basis.

The carrier frequency offset may be ±fs/4 when fs is a sample frequency.

In the assigning of the carrier frequency offset(s), the processor may cause the device to perform: switching the at least one pair of signals among the plurality of signals between an in-phase channel and a quadrature-phase channel according to a change in a sample period; and sign-inverting the at least one pair of signals switched to the in-phase channel or the quadrature-phase channel.

In the sign-inverting of the at least one pair of signals switched to the in-phase channel or the quadrature-phase channel, the processor may cause the device to perform: multiplying a first signal from the at least one pair of signals switched to the in-phase channel or the quadrature-phase channel by a first sign inversion pattern or a third sign inversion pattern, and outputting a result; and multiplying a second signal from the at least one pair of signals switched to the in-phase channel or the quadrature-phase channel by a second sign inversion pattern or a fourth sign inversion pattern, and outputting a result.

In the assigning of the carrier frequency offset(s), the processor may cause the device to perform: sign-inverting the at least one pair of signals; and switching the sign-inverted at least one pair of signals between an in-phase channel and a quadrature-phase channel according to a change in a sample period.

According to the present disclosure, a satellite navigation system can apply carrier frequency offset(s) selectively to certain signals with low implementation complexity, while still maintaining a constant envelope multiplexing condition. This allows the satellite navigation system to reduce implementation complexity compared to previous methods without applying carrier frequency offset(s). Furthermore, the system can apply the carrier frequency offset(s) selectively to certain signals while employing the constant envelope multiplexing scheme as is.

DETAILED DESCRIPTION OF THE EMBODIMENTS

Figure 1:
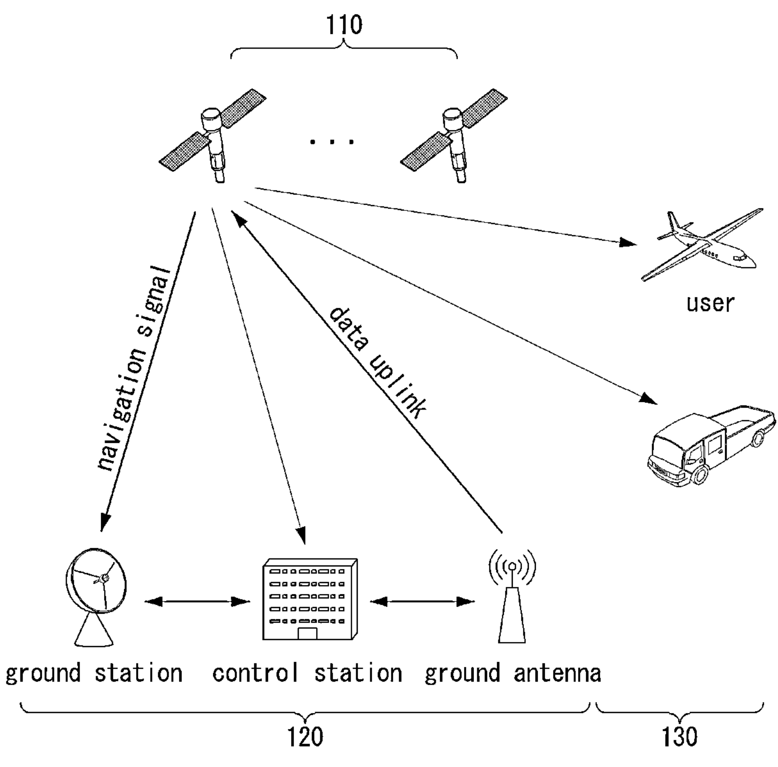
FIG. 1 is a conceptual diagram illustrating a first exemplary embodiment of a satellite navigation system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

The satellite navigation systems are satellite-based systems that provide three-dimensional positioning and time synchronization information through distance measurement using radio waves and position information of satellites received from a constellation of multiple satellites in Earth's orbits. The satellite navigation systems began in the 1970s with the development and construction of America's Global Positioning System (GPS) and Russia's Global Navigation Satellite System (GLONASS), both of which are comprised of mid-orbit satellites. Thereafter, India's Navigation with Indian Constellation (NavIC) and China's BeiDou Navigation Satellite System (BDS) were completed in 2016 and 2020, respectively. Europe's Galileo system and Japan's Quasi-Zenith Satellite System (QZSS) are currently under development and construction.

The satellite navigation system can use frequency bands allocated for radio navigation purposes. In this regard, the L1 frequency band is utilized by systems such as GPS, GLONASS, Galileo, BDS, and QZSS. Additionally, the L2 frequency band is used by systems such as GPS, GLONASS, and QZSS, while the L5 frequency band is employed by systems such as GPS, GLONASS, BDS, NavIC, Galileo, and QZSS. The L6 frequency band is utilized by systems such as Galileo, BDS, QZSS, etc., and the S frequency band is used by NavIC.

FIG. 1 is a conceptual diagram illustrating a first exemplary embodiment of a satellite navigation system.

Referring to FIG. 1, the satellite navigation system may include a space segment 110 that transmits navigation signals in space to provide positioning, navigation, and timing services anywhere on Earth, a control segment 120 that provides support and control for providing navigation services, and a user segment 130 that uses navigation services.

Figure 2:
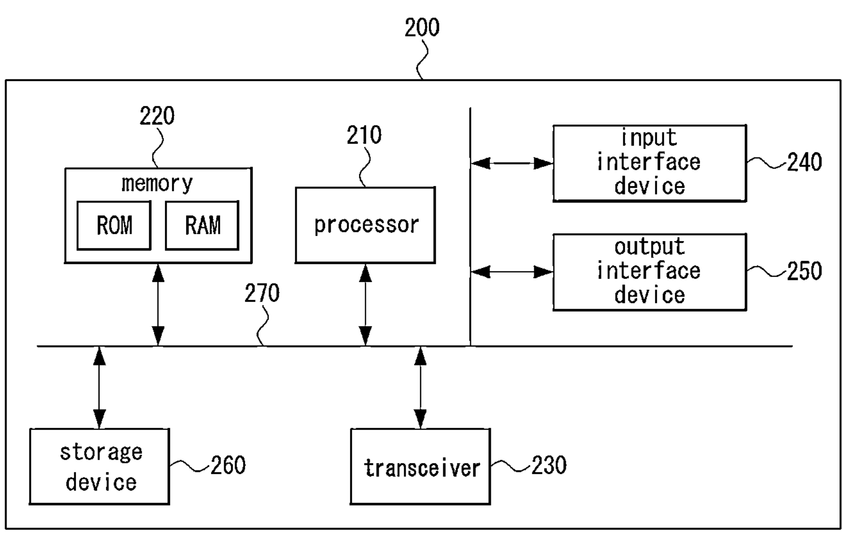
FIG. 2 is a block diagram illustrating a first exemplary embodiment of a communication node constituting a satellite navigation system.

FIG. 2 is a block diagram illustrating a first exemplary embodiment of a communication node constituting a satellite navigation system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Meanwhile, in satellite navigation systems, the power spectral density (PSD) of signals in each frequency band may have a symmetrical form based on the center frequency of the frequency band in use. However, the frequency bands used by satellite navigation systems may not be the same. Accordingly, interference between satellite navigation systems may have asymmetric characteristics. For example, in case of GLONASS, a center frequency of all signals may be different from center frequencies of signals used in other satellite navigation systems. The B1 and B3 bands of BDS II, and the B3 band of BDS III may also use different center frequencies than those of GPS, Galileo, NavIC, and QZSS.

Figure 3:
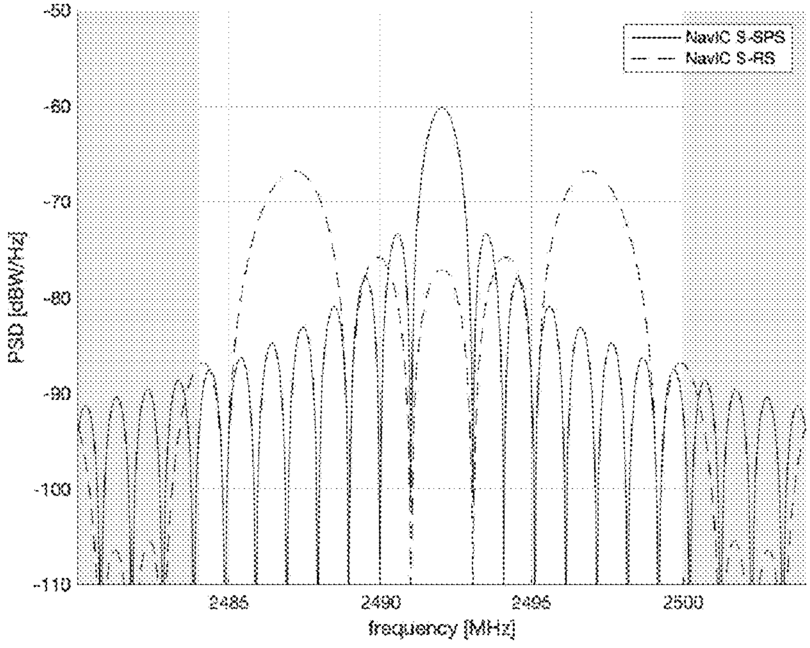
FIG. 3 is a graph illustrating a first exemplary embodiment of power spectral density with respect to frequency bands.

FIG. 3 is a graph illustrating a first exemplary embodiment of power spectral density with respect to frequency bands.

Referring to FIG. 3, a power spectral density (PSD) distribution of standard positioning service (SPS) signals in the S band of NavIC may be symmetrical with respect to a center frequency of 2492.028 MHz. In addition, a PSD distribution of restricted service (RS) signals in the S band of NavIC may be symmetrical with respect to a center frequency of 2492.028 MHz.

Figure 4:
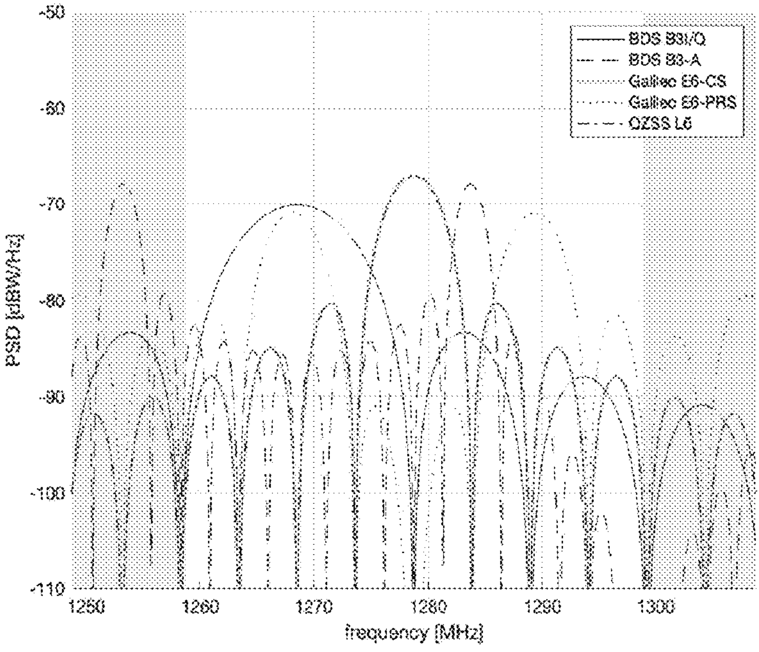
FIG. 4 is a graph illustrating a second exemplary embodiment of power spectral density with respect to frequency bands.

FIG. 4 is a graph illustrating a second exemplary embodiment of power spectral density with respect to frequency bands.

Referring to FIG. 4, in the L6 band of BDS, B3 in-phase (I)/quadrature-phase (Q) signals may be transmitted with a center frequency of 1268.52 MHz. In addition, in the L6 band of BDS, B3 A signals may be transmitted with a center frequency of 1268.52 MHz. In addition, in the L6 band of Galileo, E6 commercial service (CS) signals may be transmitted with a center frequency of 1278.75 MHz. In addition, in the L6 band of Galileo, E6 public regulated service (PRS) signals may be transmitted with a center frequency of 1278.75 MHz. In addition, in the L6 band of QZSS, signals may be transmitted with a center frequency of 1278.75 MHz. Accordingly, a spectral distribution of signals in the L6 band may be asymmetric overall.

Considering the above-described asymmetric interference characteristics, a satellite navigation system may allow a new satellite navigation signal to be additionally transmitted in the same frequency band to have an asymmetric spectrum. To achieve this, the satellite navigation system may apply an offset to the center frequency of some signals among those to be transmitted in one frequency band. However, in this case, the complexity of implementing a signal generator may increase, and it may be difficult to design constant envelope multiplexing. Accordingly, in order to design a signal scheme for the satellite navigation systems, the present disclosure provides methods of selectively applying carrier frequency offset(s) to some signals with low implementation complexity while maintaining a constant envelope multiplexing condition.

To elaborate on this further, a density of a spectrum comprised of signals used by satellite navigation systems may have an asymmetric form. For example, in case of the S band, NavIC may achieve symmetrical spectral density by transmitting a binary phase shift keying (BPSK) (1) signal and a binary offset carrier (BOC) (5,2) signal with a center frequency of 2492.028 MHz. Meanwhile, in case of the L6 band, Galileo and QZSS may achieve a symmetrical spectral density by transmitting BPSK (5) and BOCcos (10,5) signals with a center frequency of 1278.75 MHz. On the other hand, BDS may transmit BPSK (10) and BOC (15, 2.5) signals with a center frequency of 1268.52 MHz, so that the L6 band achieves an asymmetric spectrum density overall.

Meanwhile, a newly-designed satellite navigation system may be designed to sufficiently reduce the impact of interference on services of the existing satellite navigation systems. In addition, the newly-designed satellite navigation system may be designed to have sufficiently small interference effects from signals transmitted from the existing satellite navigation systems.

From this perspective, 1263.405 MHz to 1273.635 MHz in the L6 band illustrated above may not be used if possible. This is because one of two main lobes of the Galileo E6 PRS BOCcos (10,5) signal with a center frequency of 1278.75 MHz and a main lobe of the BDS B3 BPSK (10) signal with a center frequency of 1268.52 MHz may overlap. As described above, a new satellite navigation signal scheme may be designed to have an asymmetric spectrum by considering the existing signal spectrum configurations of the corresponding frequency band.

A method to implement the asymmetric spectrum may be to apply a carrier frequency offset to some signals. However, in this case, implementation complexity of a signal generator may increase, and it may be difficult to design constant envelope multiplexing. Accordingly, the conventional satellite navigation systems may use the same center frequency of all signals for each band.

Accordingly, when designing a signal scheme of a satellite navigation system, the present disclosure provides methods of selectively applying carrier frequency offset(s) to some signals with low implementation complexity while maintaining a constant envelope multiplexing condition. The methods proposed in the present disclosure can reduce implementation complexity compared to before applying the carrier frequency offset(s). In addition, the methods proposed in the present disclosure can selectively apply carrier frequency offset(s) to some signals while still applying the constant envelope multiplexing scheme. A general method of applying a carrier frequency offset may be as shown in Equation 1.

$$s_{typ}(t) = e^{j2\pi\Delta ft} s_0(t) \quad \text{[Equation 1]}$$

Here, Δf may be a carrier frequency offset. $s_0(t)$ may be an original input signal before applying the carrier frequency offset. $s_{typ}(t)$ may be an output signal to which the carrier frequency offset according to Equation 1 is applied. In Equation 1, a phase of the output signal to which the carrier frequency offset is applied may change at every continuous time. As a result, when a satellite uses Equation 1 to apply an offset to a carrier frequency, the amount of calculation may increase. In addition, when the satellite implements this carrier frequency offset scheme, implementation complexity may increase. Further, it may be very difficult for the satellite to perform constant envelope multiplexing with other signals to which the carrier frequency offset is not applied. In some cases, it may be impossible for the satellite to perform constant envelope multiplexing with other signals to the carrier frequency offset is not applied. Therefore, the design of selective carrier frequency offset application scheme may be paralleled with the design of constant envelope multiplexing. The most preferable design scheme may be to apply the same constant envelope multiplexing scheme regardless of the carrier frequency offset. The present disclosure may fall into the latter category.

A method of assigning a carrier frequency offset that can be implemented with low complexity may be a method of applying a signal phase change due to the carrier frequency offset on a sample basis. The carrier frequency offset may be (±¼)*fs (here, fs is a sample frequency). In this case, a method for assigning a carrier frequency offset may be as shown in Equation 2.

$$s_{new}(t) = e^{\pm j\frac{\pi}{2}\lfloor f_s t \rfloor} s_0(t) \quad \text{[Equation 2]}$$

Here, fs may be the sample frequency. $\lfloor\cdot\rfloor$ may mean an integer that does not exceed a value in parentheses. $s_0(t)$ may be an original signal before applying the carrier frequency offset. In addition, $s_{new}(t)$ may be an output signal to which a carrier frequency offset given according to Equation 2 is applied. This method of assigning the carrier frequency offset in Equation 2 may be transformed into Equation 3 below.

$$s_{new}(t) = \frac{1 \mp j}{2}\left(c_I(t) \pm jc_Q(t)\right)s_0(t) \quad \text{[Equation 3]}$$

Figure 5A:
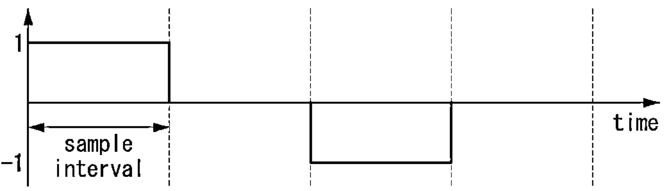
FIG. 5A is a waveform diagram showing a first exemplary embodiment of $c_I(t)$ for carrier frequency offset.
Figure 5B:
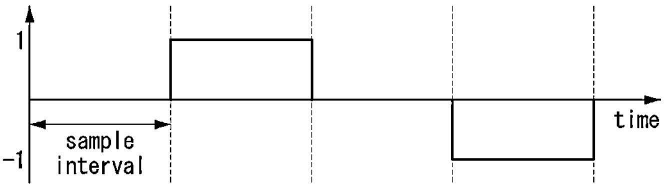
FIG. 5B is a waveform diagram showing a first exemplary embodiment of $c_Q(t)$ for a carrier frequency offset.

Here, $c_I(t)$ may be a signal having a waveform shown in FIG. 5A. $c_Q(t)$ may be a signal having a waveform as shown in FIG. 5B. $s_0(t)$ may be an original signal before applying the carrier frequency offset. In addition, $s_{new}(t)$ may be an output signal to which a carrier frequency offset given according to Equation 3 is applied.

FIG. 5A is a waveform diagram showing a first exemplary embodiment of $c_I(t)$ for carrier frequency offset.

Referring to FIG. 5A, a waveform of $c_I(t)$ may have a positive value (e.g. 1) in a first sample period. Then, the waveform of $c_I(t)$ may have a value of 0 in a second sample period following the first sample period. Then, the waveform of $c_I(t)$ may have a negative value (e.g. −1) in a third sample period following the second sample period. Then, the waveform of $c_I(t)$ may have a value of 0 in a fourth sample period following the third sample period. $c_I(t)$ described above may be repeated for all sample periods. Here, a sample interval for the sample period may be a reciprocal of the sample frequency fs.

FIG. 5B is a waveform diagram showing a first exemplary embodiment of $c_Q(t)$ for a carrier frequency offset.

Referring to FIG. 5B, a waveform of $c_Q$ (t) may have a value of 0 in a first sample period. Then, the waveform of $c_Q(t)$ may have a positive value (e.g. 1) in a second sample period following the first sample period. Then, the waveform of $c_Q$ (t) may have a value of 0 in a third sample period following the second sample period. Then, the waveform of $c_Q$ (t) may have a negative value (e.g. −1) in a fourth sample period following the third sample period. $c_Q$ (t) described above may be repeated for all sample periods. Here, a sample interval may be a reciprocal of the sample frequency fs.

As can be seen in FIGS. 5A and 5B, since a phase of the output signal to which the carrier frequency offset is applied may be increased or decreased by 90° from a phase of the original signal, it can be easily implemented by a combination of an operation of switching to an in-phase channel or quadrature-phase channel and a sign inversion operation.

Figure 6:
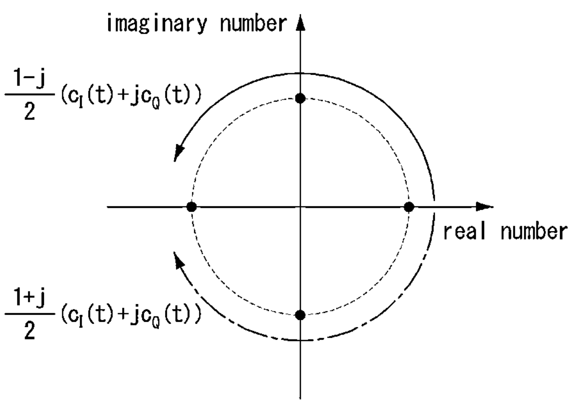
FIG. 6 is a conceptual diagram showing a first exemplary embodiment for describing a change in a phase of a signal due to a carrier frequency offset.

FIG. 6 is a conceptual diagram showing a first exemplary embodiment for describing a change in a phase of a signal due to a carrier frequency offset.

Referring to FIG. 6, a phase of a signal may shift by 90° during a sample time in a counterclockwise or clockwise direction depending on a sign of a carrier frequency offset. However, in case of Equations 2 and 3, since a phase of one signal changes with time as in case of Equation 1, a phase relationship of signals to be multiplexed may vary at each moment. As a result, constant envelope multiplexing design may become difficult, and implementation complexity may increase. This problem can be solved by applying carrier frequency offset(s) to a pair of quadrature signals.

Figure 7:
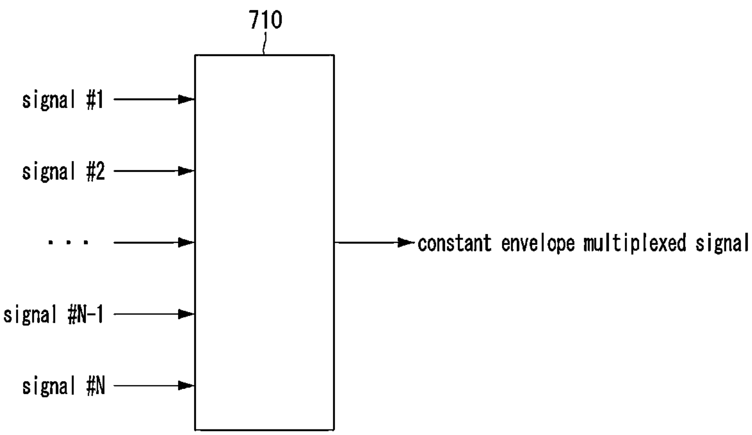
FIG. 7 is a block diagram showing a first exemplary embodiment of a satellite navigation signal generation device.

FIG. 7 is a block diagram showing a first exemplary embodiment of a satellite navigation signal generation device.

Referring to FIG. 7, the satellite navigation signal generation device may not use carrier frequency offsets. This satellite navigation signal generation device may include a constant envelope multiplexer 710 that receives N signals (e.g. signals #1 to #N), performs constant envelope multiplexing thereon, and outputs a constant envelope multiplexed signal. Here, N may be a positive integer.

For example, among the N signals, a signal #N−1 and a signal #N may be binary phase signals having the same magnitude. In this case, the constant envelope multiplexer may perform constant envelope multiplexing on the signals #1 to #N. In this case, a phase of the signal #N may be delayed by 90° compared to a phase of the signal #N−1. In this situation, the constant envelope multiplexer may assign carrier frequency offsets of Equation 2 to the signal #N−1 and the signal #N. Accordingly, at every sample time, the signal N−1 and the signal N may alternately exchange phases with each other. Here, each of the N signals may be a pilot or data signal sample sequence to which a spread spectrum code and a chip pulse waveform are applied.

Figures 8, 9:
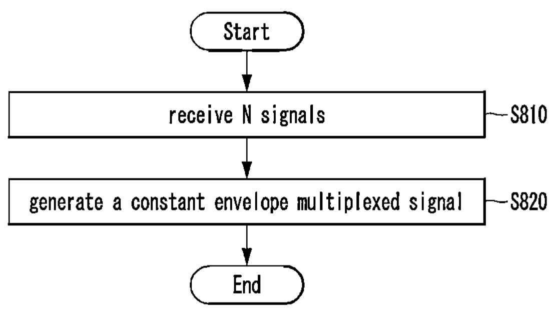
FIG. 8 is a flowchart showing a first exemplary embodiment of a satellite navigation signal generation method.
FIG. 9 is a block diagram showing a second exemplary embodiment of a satellite navigation signal generation device.

FIG. 8 is a flowchart showing a first exemplary embodiment of a satellite navigation signal generation method.

Referring to FIG. 8, the satellite navigation signal generation device may receive N signals (e.g. signals #1 to #N) (S810). In addition, the satellite navigation signal generation device may perform constant envelope multiplexing thereon and output a constant envelope multiplexed signal (S820). Here, N may be a positive integer.

FIG. 9 is a block diagram showing a second exemplary embodiment of a satellite navigation signal generation device.

Referring to FIG. 9, the satellite navigation signal generation device may receive N signals (e.g. signals #1 to #N). In addition, the satellite navigation signal generation device may use a frequency offset unit 910 to assign carrier frequency offsets to a pair of quadrature signals among the N signals (e.g. signals #1 to #N). Here, the pair of quadrature signals may be a signal #N−1 and a signal #N, for example. In this case, the signal #N−1 and the signal #N may be binary phase signals having the same magnitude. Here, a phase of the signal #N may be delayed by 90° compared to a phase of the signal #N−1. That is, the signal #N−1 and the signal #N may be quadrature signals with each other.

In addition, the satellite navigation signal generation device may receive the N signals (e.g. signals #1 to #N) including the pair of quadrature signals to which the carrier frequency offsets are applied, and output a constant envelope multiplexed signal by performing constant envelope multiplexing through a constant envelope multiplexer 920. Here, N may be a positive integer.

Meanwhile, the frequency offset unit 910 may include a sample switch 911, a first multiplier 912, and a second multiplier 913. The sample switch 911 may include a pair of input terminals and a pair of output terminals. The pair of input terminals may include a first input terminal and a second input terminal. The pair of output terminals may include a first output terminal and a second output terminal. Here, the first output terminal may be connected to the first multiplier 912, and the second output terminal may be connected to the second multiplier 913.

The sample switch 911 may output the pair of quadrature signals from the first input terminal to the first output terminal and from the second input terminal to the second output terminal during each odd-numbered sample period starting from the first same period. In addition, the sample switch 912 may cross-output the pair of quadrature signals from the first input terminal to the second output terminal and from the second input terminal to the first output terminal during each even-numbered sample period.

That is, for example, the sample switch 911 may receive the signal #N−1 through the first input terminal and deliver it to the first multiplier 912 through the first output terminal during each odd-numbered sample period, starting from the first sample period. In addition, the sample switch 911 may receive the signal #N through the second input terminal and deliver it to the second multiplier 913 through the second output terminal during each odd-numbered sample period, starting from the first sample period.

On the other hand, the sample switch 911 may, for example, receive the signal #N−1 through the first input terminal and deliver it to the second multiplier 913 through the second output terminal during each even-numbered sample period. In addition, the sample switch 911 may receive the signal #N through the second input terminal and deliver it to the first multiplier 912 through the first output terminal during each even-numbered sample period.

As described above, the sample switch 911 may deliver the upper input (input of the first input terminal) and the lower input (input of the second input terminal) to the upper output (first output terminal) and the lower output (output of the second output terminal) during the odd-numbered sample period starting from the first sample period. On the other hand, the sample switch 911 may cross-output the upper input to the lower output and the lower input to the upper output during the even-numbered sample period.

In addition, the first multiplier 912 may multiply one signal of the pair of quadrature signals passing through the sample switch 911 by a first sign inversion pattern signal or a third sign inversion pattern signal, and output a result. Here, the first sign inversion pattern signal may have values of [+1, −1, −1, +1] sequentially during the respective sample periods from the first to the fourth sample period. The third sign inversion pattern signal may have values of [+1, +1, −1, −1] sequentially during the respective sample periods from the first to the fourth sample period. Here, each sign inversion signal may be valid during the corresponding sample period.

Accordingly, the frequency offset unit 910 may allow the first multiplier 912 to perform a sign inversion operation using the first sign inversion pattern signal, so that a carrier frequency offset of fs/4 is applied to one signal of the pair of quadrature signals passing through the sample switch 911. Alternatively, the frequency offset unit 910 may allow the first multiplier 912 to perform a sign inversion operation using the third sign inversion pattern signal, so that a carrier frequency offset of −fs/4 is applied to one signal of the pair of quadrature signals passing through the sample switch 911.

On the other hand, the second multiplier 913 may multiply the other signal of the pair of quadrature signals passing through the sample switch 911 by a second sign inversion pattern signal or a fourth sign inversion pattern signal, and output a result. Here, the second sign inversion pattern signal may have values of [+1, +1, −1, −1] sequentially during the respective sample periods from the first to the fourth sample period. The fourth sign inversion pattern signal may have values of [+1, −1, −1, +1] sequentially during the respective sample periods from the first to the fourth sample period. Here, each sign inversion signal may be valid during the corresponding sample period.

Accordingly, the frequency offset unit 910 may allow the second multiplier 913 to perform a sign inversion operation using the second sign inversion pattern signal, so that a carrier frequency offset of fs/4 is applied to the other signal of the pair of quadrature signals passing through the sample switch 911. Alternatively, the frequency offset unit 910 may allow the second multiplier 913 to perform a sign inversion operation using the fourth sign inversion pattern signal, so that a carrier frequency offset of −fs/4 is applied to the other signal of the pair of quadrature signals passing through the sample switch 911.

Here, an operation clock of the sign inversion operation for multiplying the repeating pattern of [+1, −1, −1, +1] and [+1, +1, −1, −1], which is performed after the sample switch 911, may have a speed that is a common multiple of sample frequencies of the signal #N−1 and the signal #N.

As described above, the satellite signal generation device can use the existing constant envelope multiplexing algorithm after the simple switching operations and the sign inversion operations without designing a new constant envelope multiplexing algorithm or changing the design thereof.

Figure 10:
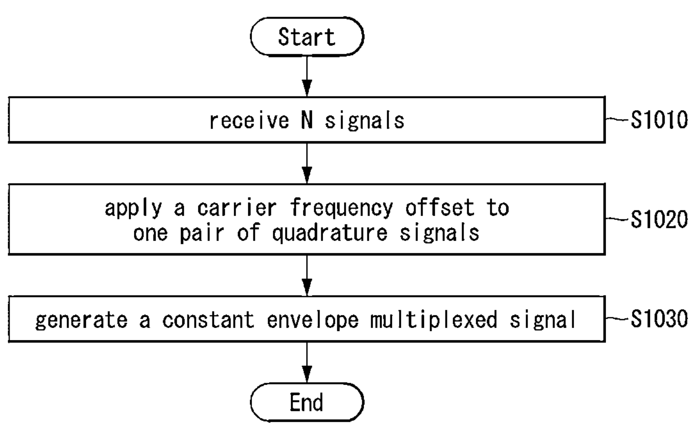
FIG. 10 is a flowchart showing a second exemplary embodiment of a satellite navigation signal generation method.

FIG. 10 is a flowchart showing a second exemplary embodiment of a satellite navigation signal generation method.

Referring to FIG. 10, the satellite navigation signal generation device may receive N signals (e.g. signals #1 to #N) (S1010). In addition, the satellite navigation signal generation device may use a frequency offset unit to apply carrier frequency offsets to a pair of quadrature signals among the N signals (e.g. signals #1 to #N) (S1020). Here, the pair of quadrature signals may be a signal #N−1 and a signal #N, for example. In this case, the signal #N−1 and the signal #N may be binary phase signals having the same magnitude. In this case, a phase of the signal #N may be delayed by 90° compared to a phase of the signal #N−1. That is, the signal #N−1 and the signal #N may be quadrature signals with each other.

In addition, the satellite navigation signal generation device may use a constant envelope multiplexer to receive the N signals (e.g. signals #1 to #N) including the pair of quadrature signals to which the carrier frequency offsets are applied, and perform constant envelope multiplexing to output a constant envelope multiplexed signal (S1030). Here, N may be a positive integer.

On the other hand, in actual implementation, the satellite signal generation device can further reduce implementation complexity by applying a carrier frequency offset in a chip pulse waveform rather than performing sign inversion before and after the sample switch for each sample.

Figures 11, 12:
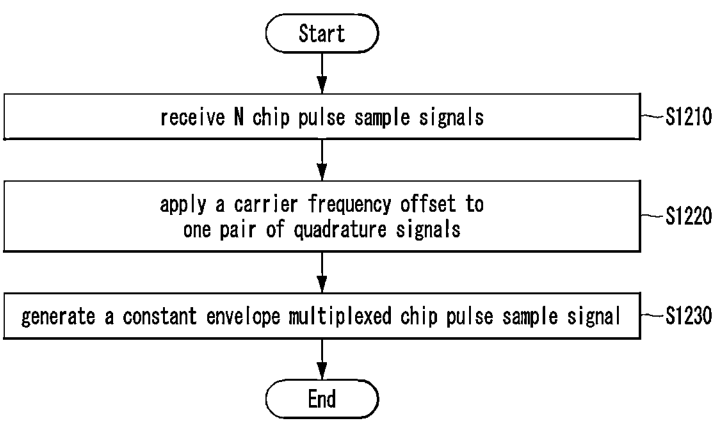
FIG. 11 is a block diagram showing a third exemplary embodiment of a satellite navigation signal generation device.
FIG. 12 is a flowchart showing a third exemplary embodiment of a satellite navigation signal generation method.

FIG. 11 is a block diagram showing a third exemplary embodiment of a satellite navigation signal generation device.

Referring to FIG. 11, the satellite navigation signal generation device may receive N signals (e.g. signals #1 to #N). Here, the N signals may be N chip pulse sample signals. In addition, the satellite navigation signal generation device may use a frequency offset unit 1110 to apply carrier frequency offsets to a pair of quadrature signals from the N chip pulse sample signals (e.g. signals #1 to #N). Here, the pair of quadrature signals may be, for example, a chip pulse sample signal #N−1 and a chip pulse sample signal #N. In this case, the chip pulse sample signal #N−1 and the chip pulse sample signal #N may be binary phase signals having the same magnitude. In this case, a phase of the chip pulse sample signal #N may be delayed by 90° compared to a phase of the chip pulse sample signal #N−1. That is, the chip pulse sample signal #N−1 and the chip pulse sample signal #N may be quadrature signals with each other.

In addition, the satellite navigation signal generation device may receive N chip pulse sample signals (e.g. signals #1 to #N) including the pair of quadrature signals to which the carrier frequency offsets are applied and perform constant envelope multiplexing through a constant envelope multiplexer 1120 to output constant envelope multiplexed chip pulse sample signals. Here, N may be a positive integer.

Meanwhile, the frequency offset unit 1110 may include a first multiplier 1111, a second multiplier 1112, and a sample switch 1113. In this case, the sample switch 1113 may include a pair of input terminals and a pair of output terminals. The pair of input terminals may include a first input terminal and a second input terminal. The pair of output terminals may include a first output terminal and a second output terminal. Here, the first input terminal may be connected to the first multiplier 1111, and the second input terminal may be connected to the second multiplier 1112.

The first multiplier 1111 may multiply one signal of the pair of quadrature signals by a second sign inversion pattern signal or a fourth sign inversion pattern signal, and output a result. Here, the second sign inversion pattern signal may have values of [+1, +1, −1, −1] sequentially during the respective sample periods from the first to the fourth sample period. The fourth sign inversion pattern signal may have values of [+1, −1, −1, +1] sequentially during the respective sample periods from the first to the fourth sample period. Here, each sign inversion signal may be valid during the corresponding sample period.

Accordingly, the frequency offset unit 1110 may allow the first multiplier 1111 to perform a sign inversion operation using the second sign inversion pattern signal to apply a carrier frequency offset of fs/4 to one signal of the pair of quadrature signals. Alternatively, the frequency offset unit 1110 may allow the first multiplier 1111 to perform a sign inversion operation using the fourth sign inversion pattern signal to apply a carrier frequency offset of −fs/4 to one signal of the pair of quadrature signals.

On the other hand, the second multiplier 1112 may multiply the other signal of the pair of quadrature signals by a first sign inversion pattern signal or a third sign inversion pattern signal, and output a result. Here, the first sign inversion pattern signal may have values of [+1, −1, −1, +1] sequentially during the respective sample periods from the first to the fourth sample period. The third sign inversion pattern signal may have values of [+1, +1, −1, −1] sequentially during the respective sample periods from the first to the fourth sample period. Here, each sign inversion signal may be valid during the corresponding sample period.

Accordingly, the frequency offset unit 1110 may allow the second multiplier 1112 to perform a sign inversion operation using the first sign inversion pattern signal to apply a carrier frequency offset of fs/4 to the other signal of the pair of quadrature signals. In addition, the frequency offset unit 1110 may allow the second multiplier 1112 to perform a sign inversion operation using the third sign inversion pattern signal to apply a carrier frequency offset of −fs/4 to the other signal of the pair of quadrature signals.

Here, an operation clock of the sign inversion operation that multiplies the repeating pattern of [+1, +1, −1, −1] and [+1, −1, −1, +1] may have a speed that is a common multiple of sample frequencies of the signal #N−1 and the signal #N.

Here, an operation clock of the sign inversion operation for multiplying the repeating pattern of [+1, +1, −1, −1] and [+1, −1, −1, +1] may have a speed that is a common multiple of sample frequencies of the signal #N−1 and the signal #N.

Meanwhile, the sample switch 1113 may output the pair of quadrature signals from the first input terminal to the first output terminal and from the second input terminal to the second output terminal during the odd-numbered sample period starting from the first sample period. In addition, the sample switch 1113 may cross-output the pair of quadrature signals from the first input terminal to the second output terminal and from the second input terminal to the first output terminal during the even-numbered sample period.

That is, for example, the sample switch 1113 may receive the signal #N−1 from the first multiplier 1111 through the first input terminal during the odd-numbered sample period starting from the first sample period, and deliver it to the constant envelope multiplexer 1120 through the first output terminal. In addition, the sample switch 1113 may receive the signal #N from the second multiplier 1112 through the second input terminal during the odd-numbered sample period starting from the first sample period, and deliver it to the constant envelope multiplexer 1120 through the second output terminal.

On the other hand, for example, the sample switch 1113 may receive the signal #N−1 from the first multiplier 1111 through the first input terminal during the even-numbered sample period, and deliver it to the constant envelope multiplexer 1120 through the second output terminal. In addition, for example, the sample switch 1113 may receive the signal #N from the second multiplier 1112 through the second input terminal during the even-numbered sample period, and deliver it to the constant envelope multiplexer 1120 through the first output terminal.

As described above, the sample switch 1113 may deliver the upper input (input of the first input terminal) and the lower input (input of the second input terminal) to the upper output (first output terminal) and the lower output (output of the second output terminal) during the odd-numbered sample period starting from the first sample period. On the other hand, the sample switch 911 may cross-output the upper input to the lower output and the lower input to the upper output during the even-numbered sample period.

As described above, the satellite signal generation device can use the existing constant envelope multiplexing algorithm after the simple switching operations and the sign inversion operations without designing a new constant envelope multiplexing algorithm or changing the design thereof.

FIG. 12 is a flowchart showing a third exemplary embodiment of a satellite navigation signal generation method.

Referring to FIG. 12, the satellite navigation signal generation device may receive N chip pulse sample signals (e.g. signals #1 to #N) (S1210). In addition, the satellite navigation signal generation device may use a frequency offset unit to apply carrier frequency offsets to a pair of quadrature signals among the N chip pulse sample signals (e.g. signals #1 to #N) (S1220). Here, the pair of quadrature signals may be a signal #N−1 and a signal #N, for example. In this case, the signal #N−1 and signal #N may be binary phase signals having the same magnitude. In this case, a phase of the signal #N may be delayed by 90° compared to a phase of the signal #N−1. That is, the signal #N−1 and the signal #N may be quadrature signals with each other.

In addition, the satellite navigation signal generation device may receive the N chip pulse sample signals (e.g. signals #1 to #N) including the pair of quadrature signals to which carrier frequency offsets are applied, and output constant envelope multiplexed chip pulse sample signals by performing constant envelope multiplexing through a constant envelope multiplexer. Here, N may be a positive integer.

Meanwhile, when applying the methods presented in the present disclosure, the satellite signal generation device may respectively assign carrier frequency offsets of opposite signs to the pair of quadrature signals. That is, the satellite signal generation device may assign a carrier frequency offset of −fs/4 to the signal #N−1 and assign a carrier frequency offset of fs/4 to the signal #N. In this case, the satellite signal generation device can be applied without designing or changing the constant envelope multiplexing scheme.

Figure 13:
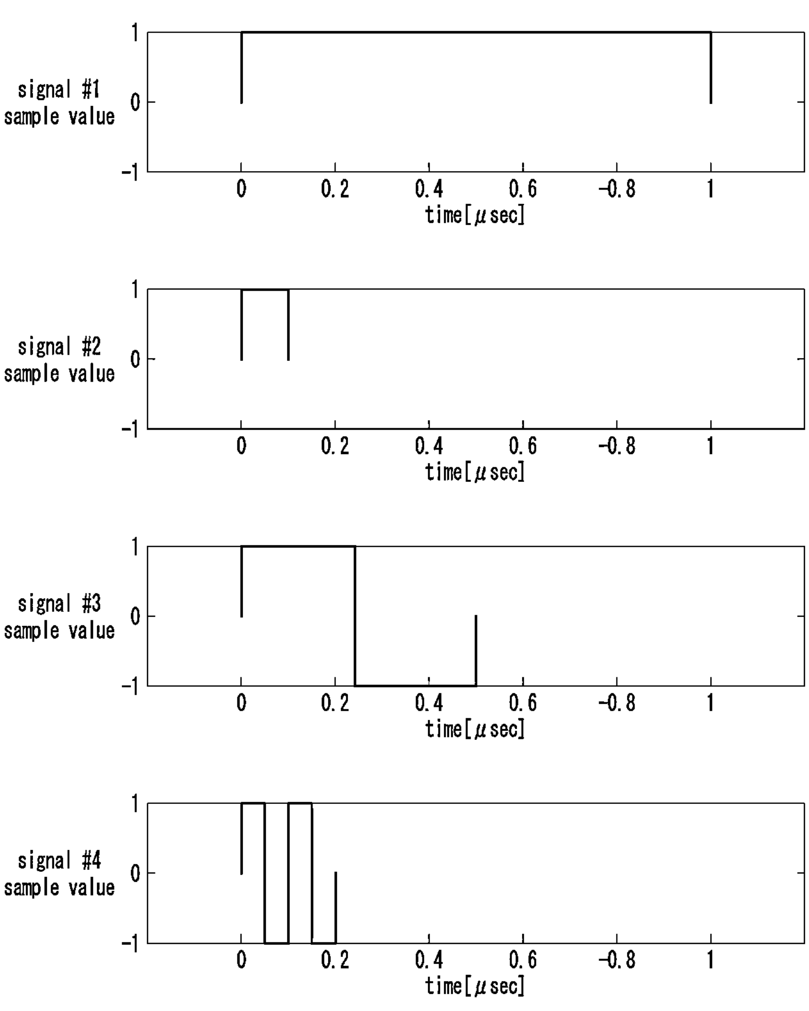
FIG. 13 is a waveform diagram showing a first exemplary embodiment of input signals used in a satellite navigation signal generation device.

FIG. 13 is a waveform diagram showing a first exemplary embodiment of input signals used in a satellite navigation signal generation device.

Referring to FIG. 13, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship.

Figure 14:
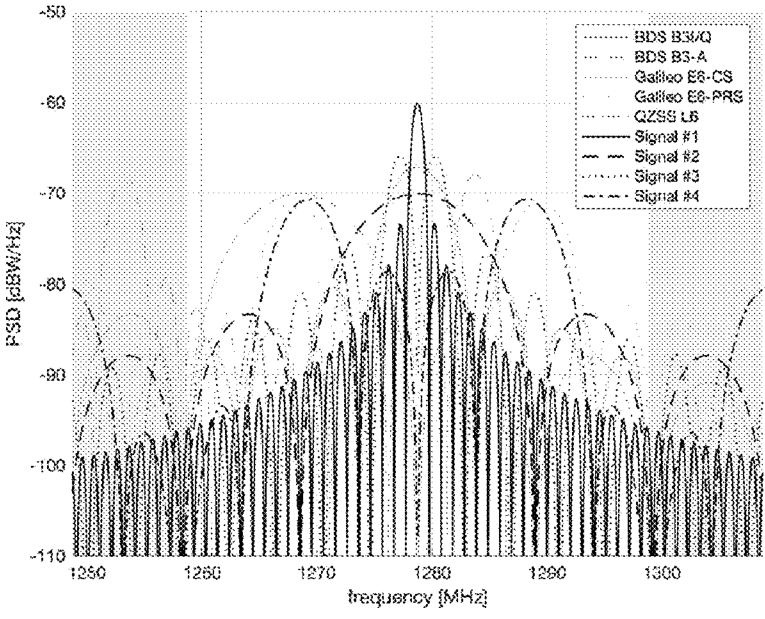
FIG. 14 is a graph showing a first exemplary embodiment of a power spectral density for a frequency band when using the input signals of FIG. 13.

FIG. 14 is a graph showing a first exemplary embodiment of a power spectral density for a frequency band when using the input signals of FIG. 13.

Referring to FIG. 14, the signal #4 may have a high degree of signal spectrum overlap with a Galileo E6 PRS signal using BOCcos (10,5). Accordingly, the satellite navigation signal generation device may consider assigning carrier frequency offsets to the signal #4 along with the signal #3.

Figure 15:
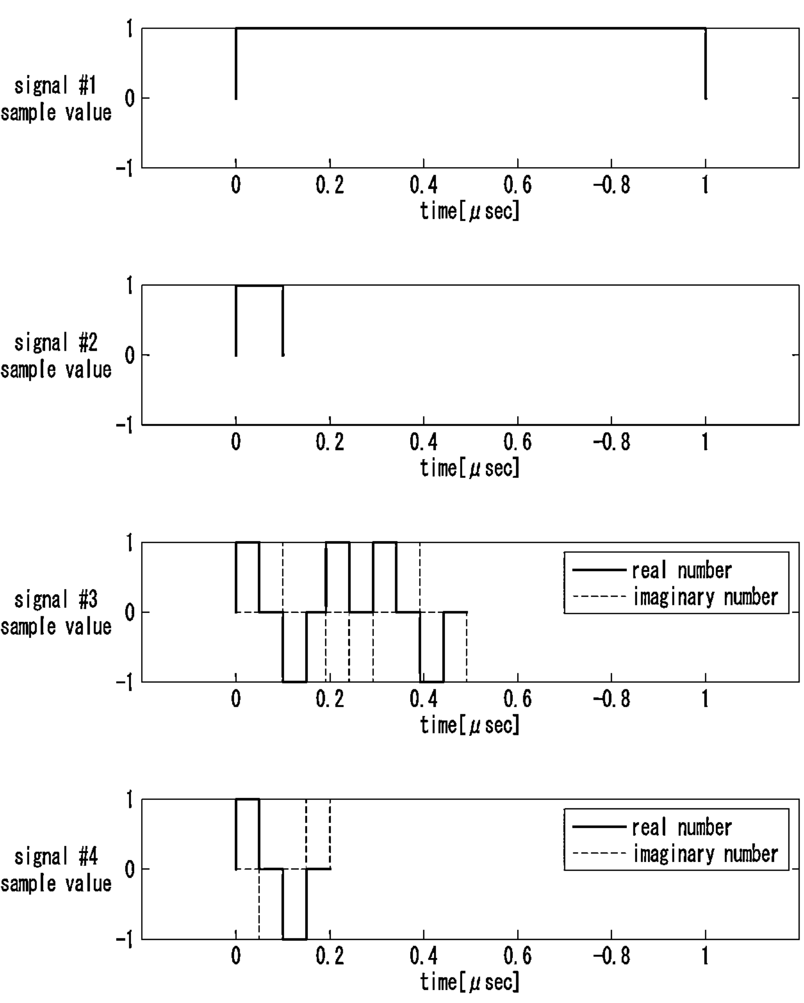
FIG. 15 is a waveform diagram showing a second exemplary embodiment of input signals used in a satellite navigation signal generation device.

FIG. 15 is a waveform diagram showing a second exemplary embodiment of input signals used in a satellite navigation signal generation device.

Referring to FIG. 15, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of 5.115 MHz to the signal #3 and signal #4 according to Equation 2 or Equation 3. In this case, the satellite navigation signal generation device may obtain chip pulse waveforms of the signal #3 and signal #4 as shown in FIG. 15.

The satellite navigation signal generation device may use continuous time complex tones. In this case, the satellite navigation signal generation device may generate a frequency shift without modifying a signal spectrum before applying carrier frequency offsets in case of Equation 1. However, since the carrier frequency offset assignment scheme of Equation 2 or Equation 3 presented in the present disclosure uses discrete time complex tones, some spectrum deformation may occur.

Figure 16:
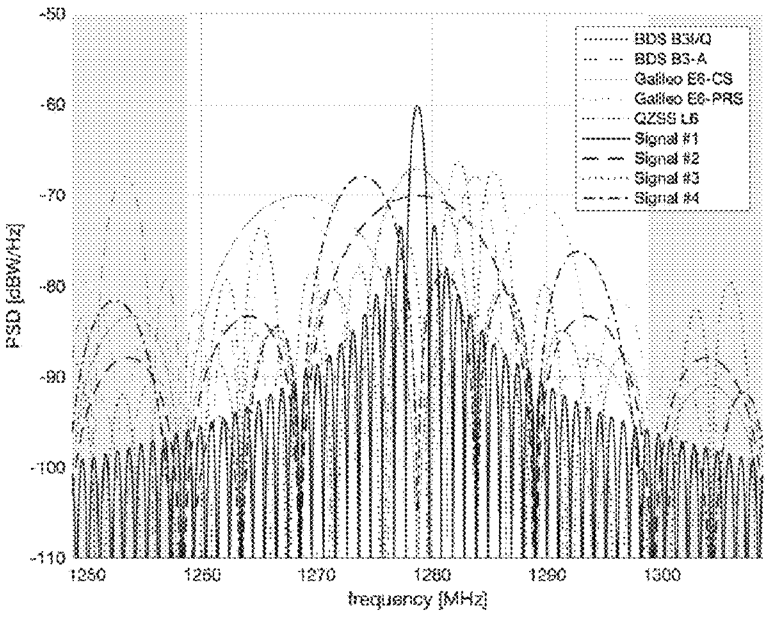
FIG. 16 is a graph showing a first exemplary embodiment of a power spectral density for a frequency band when using the input signals of FIG. 15.

FIG. 16 is a graph showing a first exemplary embodiment of a power spectral density for a frequency band when using the input signals of FIG. 15.

Referring to FIG. 16, a magnitude of a main lobe close to 1278.75 MHz, a center frequency of the L6 band, may increase in the signals #3 and #4. On the other hand, a magnitude of a main lobe distant from 1278.75 MHz, the center frequency of the L6 band, may be reduced in the signal #3 and signal #4. In this case, the two main lobes in the signal #3 and signal #4 may correspond to forms after the carrier frequency offsets according to Equation 2 or Equation 3 are applied.

Figure 17:
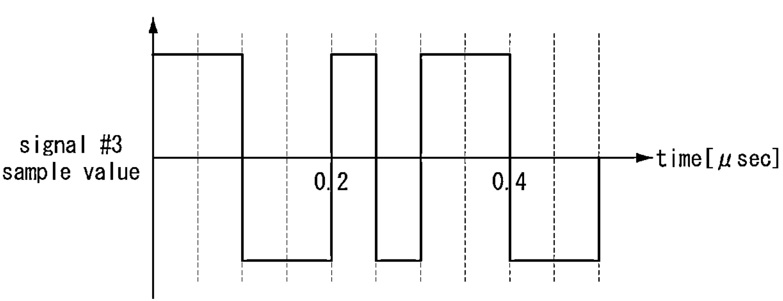
FIG. 17 is a graph showing a first exemplary embodiment of input signals of a sample switch when the input signals of FIG. 15 are used in the satellite navigation signal generation device of FIG. 11.
Figure 17:
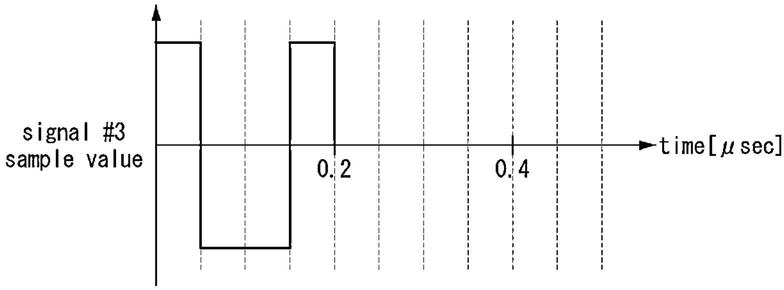

FIG. 17 is a graph showing a first exemplary embodiment of input signals of a sample switch when the input signals of FIG. 15 are used in the satellite navigation signal generation device of FIG. 11.

Referring to FIG. 17, a sum of real and imaginary components of a chip pulse waveform of the signal #3 may be applied to one input terminal of the sample switch. In addition, a sum of real and imaginary components of a chip pulse waveform of the signal #4 may be applied to the other input terminal of the sample switch.

Figure 18:
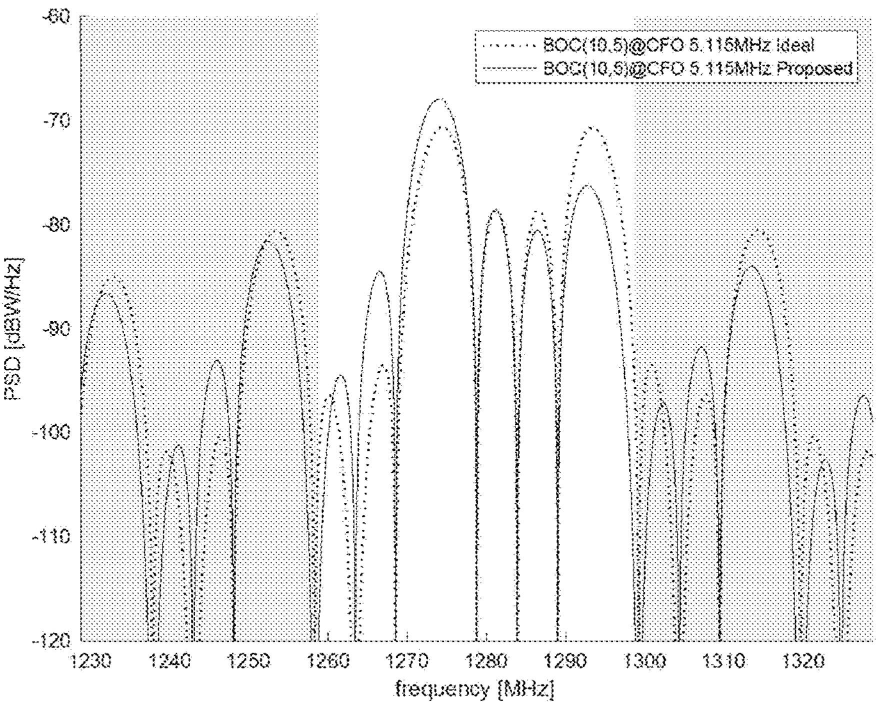
FIG. 18 is a graph showing a second exemplary embodiment of a power spectral density for a frequency band when using the input signals of FIG. 15.

FIG. 18 is a graph showing a second exemplary embodiment of a power spectral density for a frequency band when using the input signals of FIG. 15.

Referring to FIG. 18, in case of BOC (10,5), an out-of-band emission power may be reduced when applying carrier frequency offsets using Equation 2 or Equation 3 rather than when applying carrier frequency offsets according to Equation 1. In addition, in case of BOC (10,5), the out-of-band emission power may be larger before applying the carrier frequency offsets.

Figure 19:
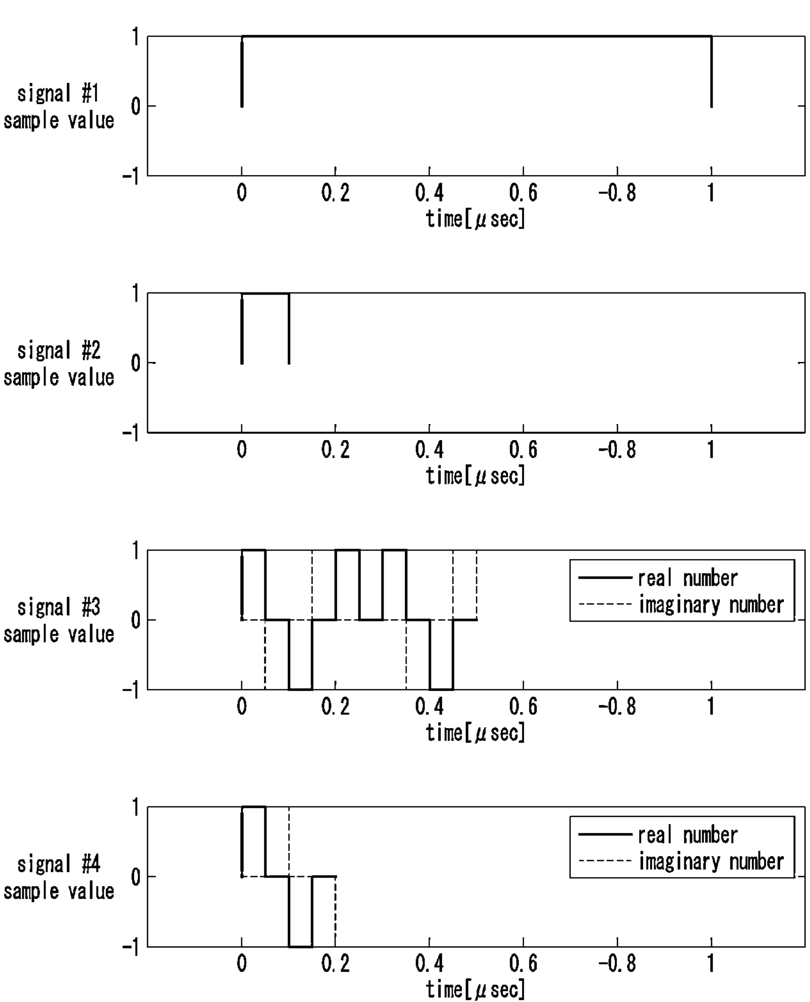
FIG. 19 is a waveform diagram showing a third exemplary embodiment of input signals used in a satellite navigation signal generation device.

FIG. 19 is a waveform diagram showing a third exemplary embodiment of input signals used in a satellite navigation signal generation device.

Referring to FIG. 19, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of −5.115 MHz to the signal #3 and signal #4 according to Equation 2 or Equation 3. In this case, the satellite navigation signal generation device may obtain chip pulse waveforms of the signal #3 and signal #4 as shown in FIG. 19.

Figure 20:
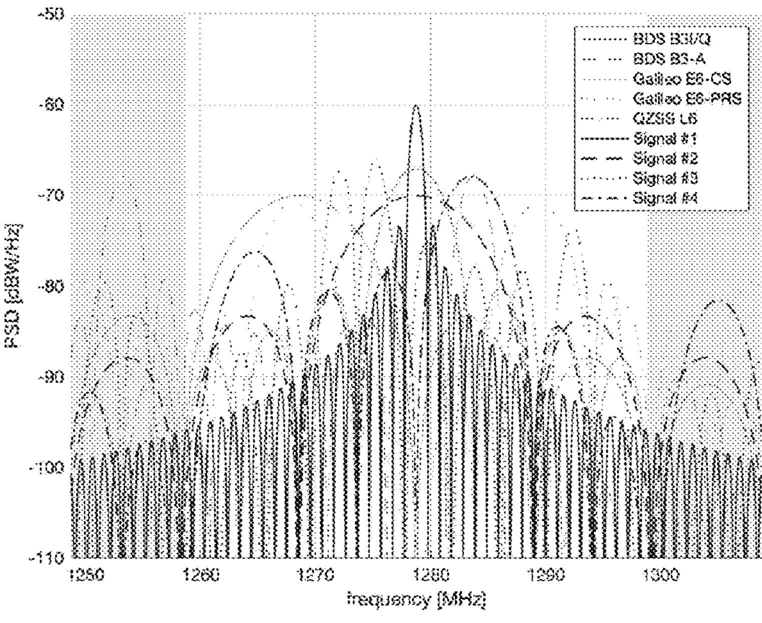
FIG. 20 is a graph showing a first exemplary embodiment of a power spectral density for a frequency band when using the input signals of FIG. 19.

FIG. 20 is a graph showing a first exemplary embodiment of a power spectral density for a frequency band when using the input signals of FIG. 19.

Referring to FIG. 20, a magnitude of a main lobe close to 1278.75 MHz, a center frequency of the L6 band, may increase in the signal #3 and signal #4. On the other hand, a magnitude of a main lobe distant from 1278.75 MHz, the center frequency of the L6 band, may be reduced in the signal #3 and signal #4. In this case, the two main lobes in the signal #3 and signal #4 may correspond to forms after carrier frequency offsets according to Equation 2 or Equation 3 are applied.

Figure 21:
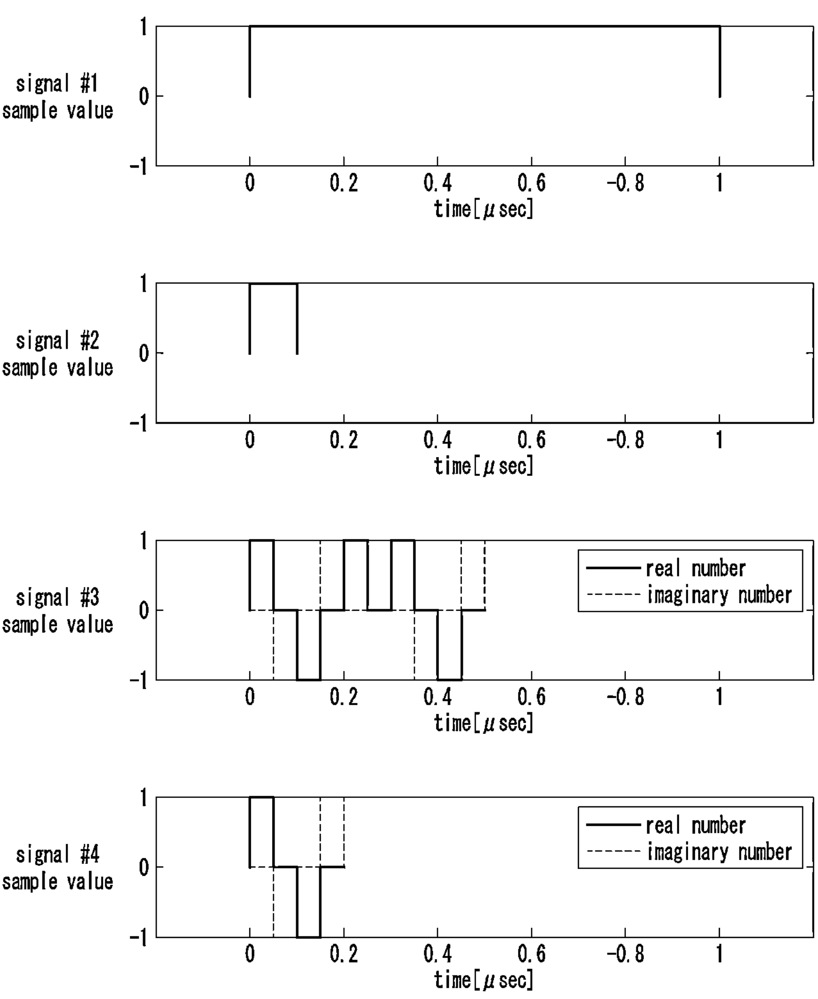
FIG. 21 is a waveform diagram showing a fourth exemplary embodiment of input signals used in a satellite navigation signal generation device.

FIG. 21 is a waveform diagram showing a fourth exemplary embodiment of input signals used in a satellite navigation signal generation device.

Referring to FIG. 21, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of −5.115 MHz to the signal #3 according to Equation 2 or Equation 3. In addition, the satellite navigation signal generation device may apply a carrier frequency offset of 5.115 MHz to the signal #4 according to Equation 2 or Equation 3. In this case, the satellite navigation signal generation device may obtain chip pulse waveforms of the signal #3 and signal #4 as shown in FIG. 21.

Figure 22:
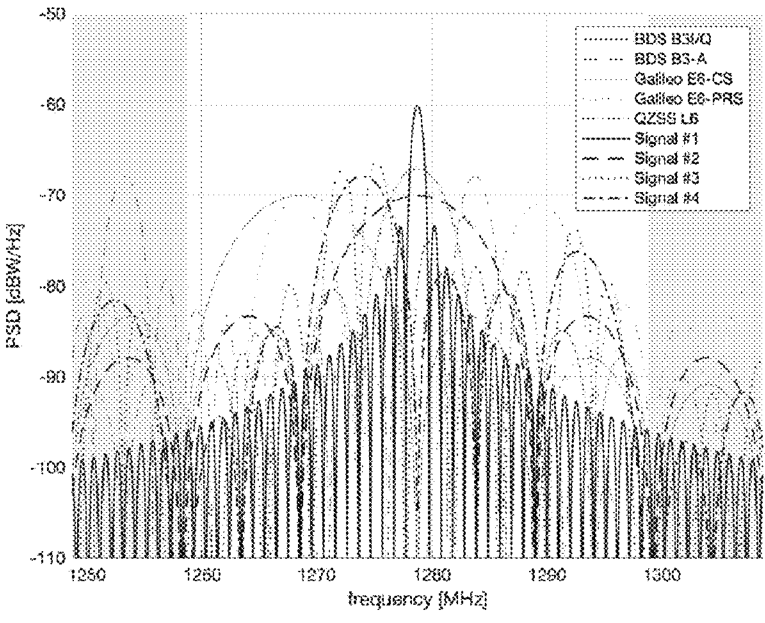
FIG. 22 is a graph showing a first exemplary embodiment of a power spectral density for a frequency band when using the input signals of FIG. 21.

FIG. 22 is a graph showing a first exemplary embodiment of a power spectral density for a frequency band when using the input signals of FIG. 21.

Referring to FIG. 22, a magnitude of a main lobe close to 1278.75 MHz, a center frequency of the L6 band, may increase in the signal #3 and signal #4. On the other hand, a magnitude of a main lobe distant from 1278.75 MHz, the center frequency of the L6 band, may be reduced in the signal #3 and signal #4. In this case, the two main lobes in the signal #3 and signal #4 may correspond to forms after carrier frequency offsets according to Equation 2 or Equation 3 are applied.

Figure 23:
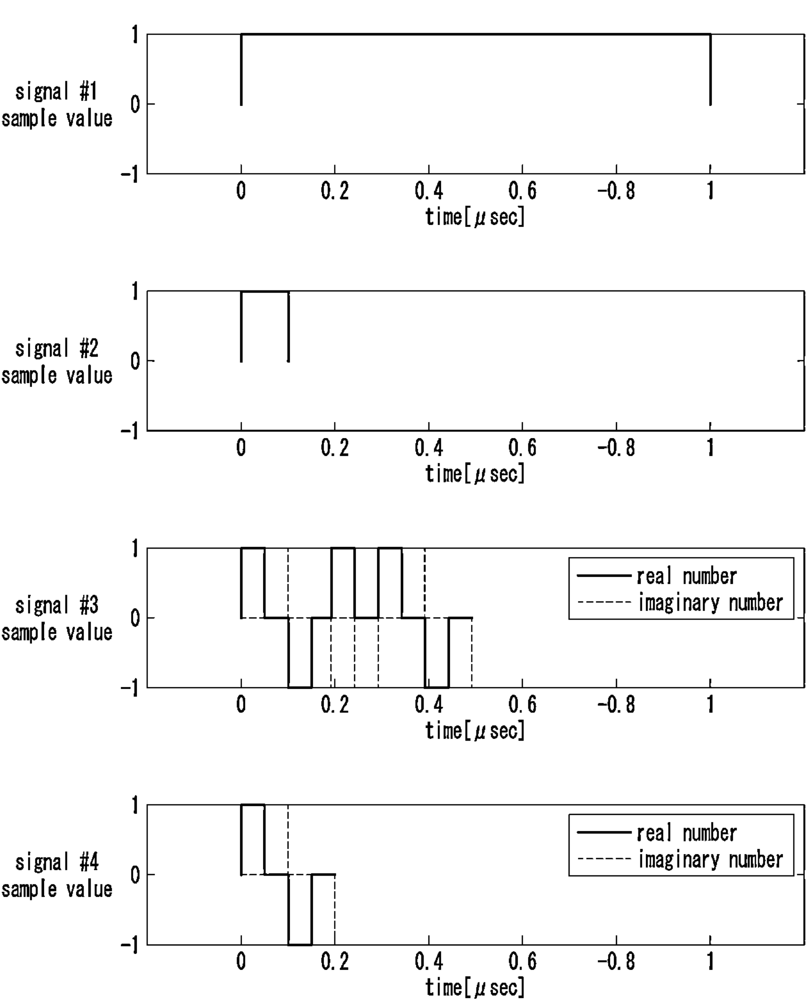
FIG. 23 is a waveform diagram showing a fifth exemplary embodiment of input signals used in a satellite navigation signal generation device.

FIG. 23 is a waveform diagram showing a fifth exemplary embodiment of input signals used in a satellite navigation signal generation device.

Referring to FIG. 23, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of 5.115 MHz to the signal #3 according to Equation 2 or Equation 3. In addition, the satellite navigation signal generation device may apply a carrier frequency offset of −5.115 MHz to the signal #4 according to Equation 2 or Equation 3. In this case, the satellite navigation signal generation device may obtain chip pulse waveforms of the signal #3 and signal #4 as shown in FIG. 23.

Figure 24:
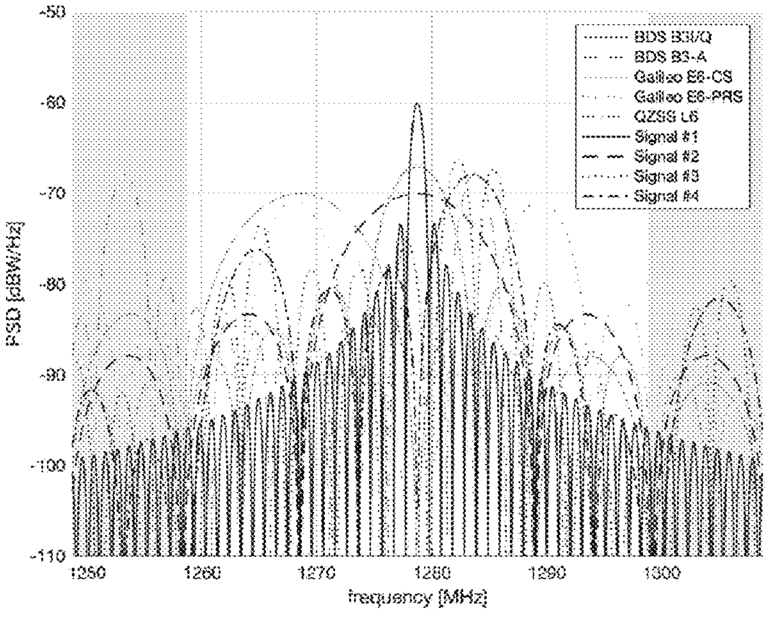
FIG. 24 is a graph showing a first exemplary embodiment of a power spectral density for a frequency band when using the input signals of FIG. 22.

FIG. 24 is a graph showing a first exemplary embodiment of a power spectral density for a frequency band when using the input signals of FIG. 22.

Referring to FIG. 24, a magnitude of a main lobe close to 1278.75 MHz, a center frequency of the L6 band, may increase in the signal #3 and signal #4. On the other hand, a magnitude of a main lobe distant from 1278.75 MHz, the center frequency of the L6 band, may be reduced in the signal #3 and signal #4. In this case, the two main lobes in the signal #3 and signal #4 may correspond to forms after a carrier frequency offset according to Equation 2 or Equation 3 is applied.

Meanwhile, Equation 2 or Equation 3 may be transformed into Equation 4 below.

$$s'_{new}(t) = \frac{1}{\sqrt{2}}\left(c'_I(t) \pm jc'_Q(t)\right)s_0(t) \quad \text{[Equation 4]}$$

Here, $c'_I(t)$ and $c'_Q(t)$ may be given as Equations 5 and 6 below.

$$c'_I(t) = \mathrm{sgn}\left(\cos\left(\frac{\pi}{2}f_s t\right)\right) \quad \text{[Equation 5]}$$

$$c'_Q(t) = \mathrm{sgn}\left(\sin\left(\frac{\pi}{2}f_s t\right)\right) \quad \text{[Equation 6]}$$

Here, sgn(•) may be represented as in Equation 7.

$$\mathrm{sgn}(x) = \begin{cases} 1, & x \geq 0 \\ -1, & x < 0 \end{cases} \quad \text{[Equation 7]}$$

Accordingly, the satellite navigation signal generation device may provide carrier frequency offsets according to Equation 4. When the satellite navigation signal generation device provides carrier frequency offsets according to Equation 4, a phase offset of ±45° may be added to the output signal by the method shown in Equation 2 or Equation 3. Although waveforms of $c'_I(t)$ and $c'_Q(t)$ are different, all characteristics except the phase offset of the output signal to which the carrier frequency offset is applied may be mathematically identical to the result of applying the method presented in Equation 2 or Equation 3.

Figure 25A:
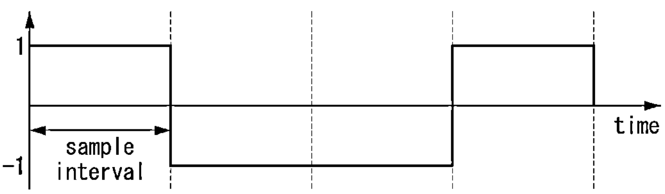
FIG. 25A is a waveform diagram illustrating a first exemplary embodiment of $c'_I(t)$ for carrier frequency offset.

FIG. 25A is a waveform diagram illustrating a first exemplary embodiment of $c'_I(t)$ for carrier frequency offset.

Referring to FIG. 25A, a waveform of $c'_I(t)$ may have a positive value (e.g. 1) in a first sample period. Then, the waveform of $c'_I(t)$ may have a negative value (e.g. −1) in a second sample period following the first sample period. Then, the waveform of $c'_I(t)$ may have a negative value (e.g. −1) in a third sample period following the second sample period. Then, the waveform of $c'_I(t)$ may have a positive value (e.g. +1) in a fourth sample period following the third sample period. $c'_I(t)$ may be repeated for all sample periods. Here, a sample interval may be a reciprocal of the sample frequency fs.

Figure 25B:
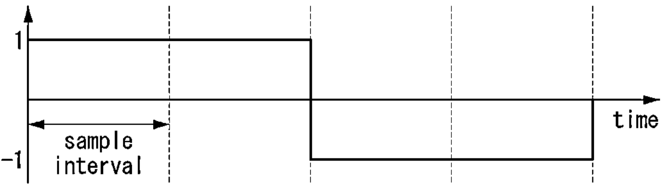
FIG. 25B is a waveform diagram illustrating a first exemplary embodiment of $c'_Q(t)$ for carrier frequency offset.

FIG. 25B is a waveform diagram illustrating a first exemplary embodiment of $c'_Q(t)$ for carrier frequency offset.

Referring to FIG. 25B, a waveform of $c'_Q(t)$ may have a positive value (e.g. 1) in a first sample period. Then, the waveform of $c'_Q(t)$ may have a positive value (e.g. 1) in a second sample period following the first sample period. Then, the waveform of $c'_Q(t)$ may have a negative value (e.g. −1) in a third sample period following the second sample period. Then, the waveform of $c'_Q(t)$ may have a negative value (e.g. −1) in a fourth sample period following the third sample period. $c'_Q(t)$ may be repeated for all sample periods. Here, a sample interval may be a reciprocal of the sample frequency fs.

As can be seen in FIGS. 25A and 25B, since a phase of the output signal to which the carrier frequency offset is applied may be increased or decreased by 90° from a phase of the original signal, it can be easily implemented by a combination of an operation of switching to an in-phase channel or quadrature-phase channel and a sign inversion operation.

Figure 26:
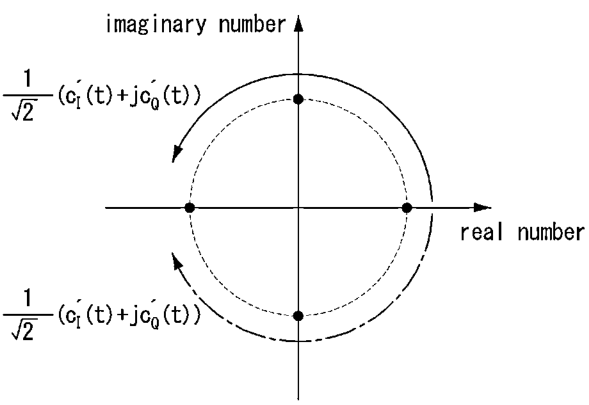
FIG. 26 is a conceptual diagram showing a second exemplary embodiment for describing a change in a phase of a signal due to a carrier frequency offset.

FIG. 26 is a conceptual diagram showing a second exemplary embodiment for describing a change in a phase of a signal due to a carrier frequency offset.

Referring to FIG. 26, a phase of a signal may shift by 90° during a sample time in a counterclockwise or clockwise direction depending on a sign of a carrier frequency offset. However, in case of Equation 4, since a phase of one signal changes with time as in case of Equation 1, a phase relationship of signals to be multiplexed may vary at each moment. As a result, constant envelope multiplexing design may become difficult, and implementation complexity may increase. This problem can be solved by applying carrier frequency offset(s) to a pair of quadrature signals.

Figure 27:
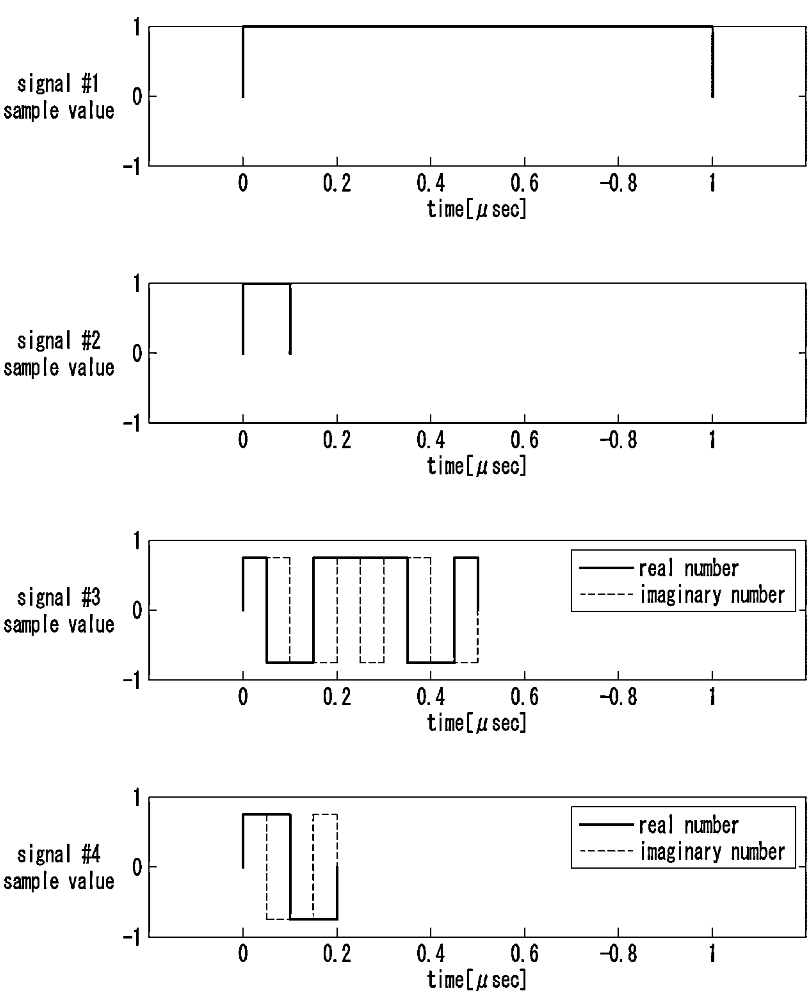
FIG. 27 is a waveform diagram showing a sixth exemplary embodiment of input signals used in a satellite navigation signal generation device.

FIG. 27 is a waveform diagram showing a sixth exemplary embodiment of input signals used in a satellite navigation signal generation device.

Referring to FIG. 27, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of 5.115 MHz to the signal #3 according to Equation 4. The satellite navigation signal generation device may apply a carrier frequency offset of 5.115 MHz to the signal #4 according to Equation 4. In this case, the satellite navigation signal generation device may obtain chip pulse waveforms of the signal #3 and signal #4 as shown in FIG. 27.

Figure 28:
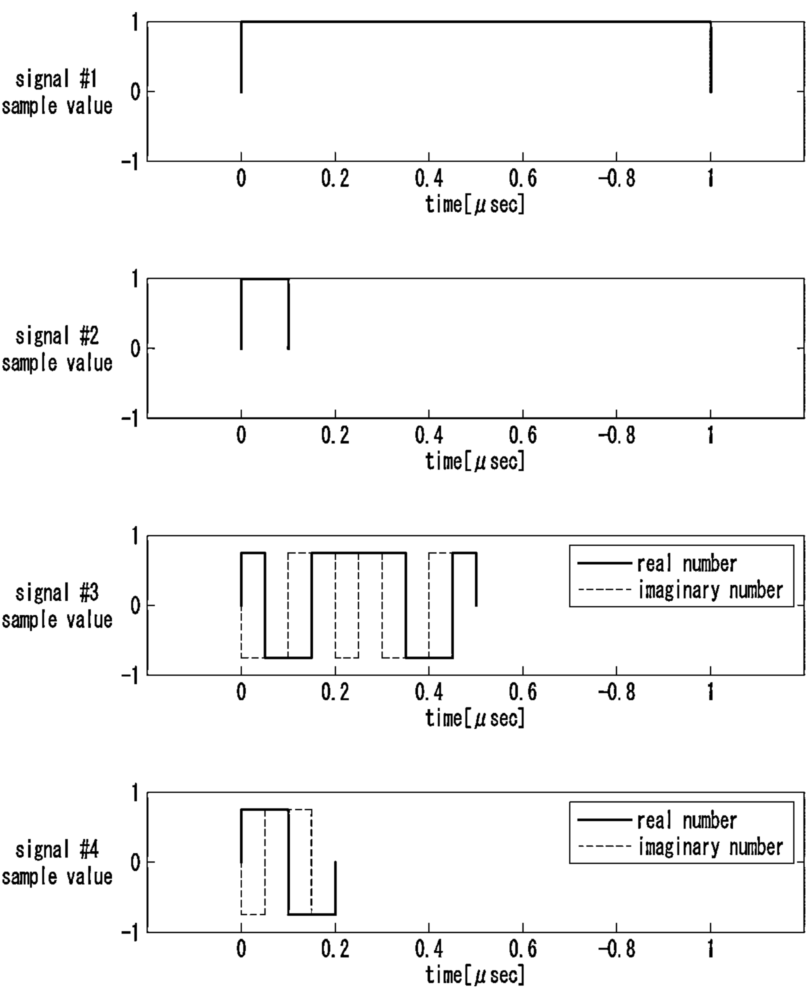
FIG. 28 is a waveform diagram showing a seventh exemplary embodiment of input signals used in a satellite navigation signal generation device.

FIG. 28 is a waveform diagram showing a seventh exemplary embodiment of input signals used in a satellite navigation signal generation device.

Referring to FIG. 28, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of −5.115 MHz to the signal #3 according to Equation 4. In addition, the satellite navigation signal generation device may apply a carrier frequency offset of −5.115 MHz to the signal #4 according to Equation 4. In this case, the satellite navigation signal generation device may obtain chip pulse waveforms of the signal #3 and signal #4 as shown in FIG. 28.

Figure 29:
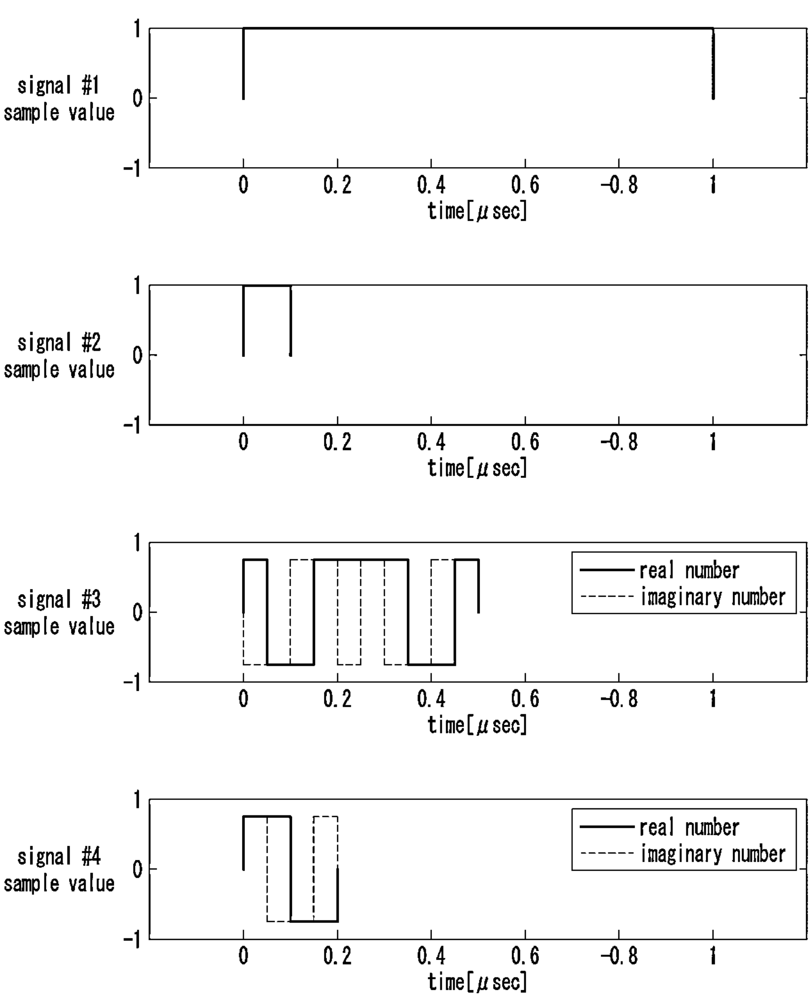
FIG. 29 is a waveform diagram showing an eighth exemplary embodiment of input signals used in a satellite navigation signal generation device.

FIG. 29 is a waveform diagram showing an eighth exemplary embodiment of input signals used in a satellite navigation signal generation device.

Referring to FIG. 29, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of −5.115 MHz to the signal #3 according to Equation 4. In addition, the satellite navigation signal generation device may apply a carrier frequency offset of 5.115 MHz to the signal #4 according to Equation 4. In this case, the satellite navigation signal generation device may obtain chip pulse waveforms of the signal #3 and signal #4 as shown in FIG. 29.

Figure 30:
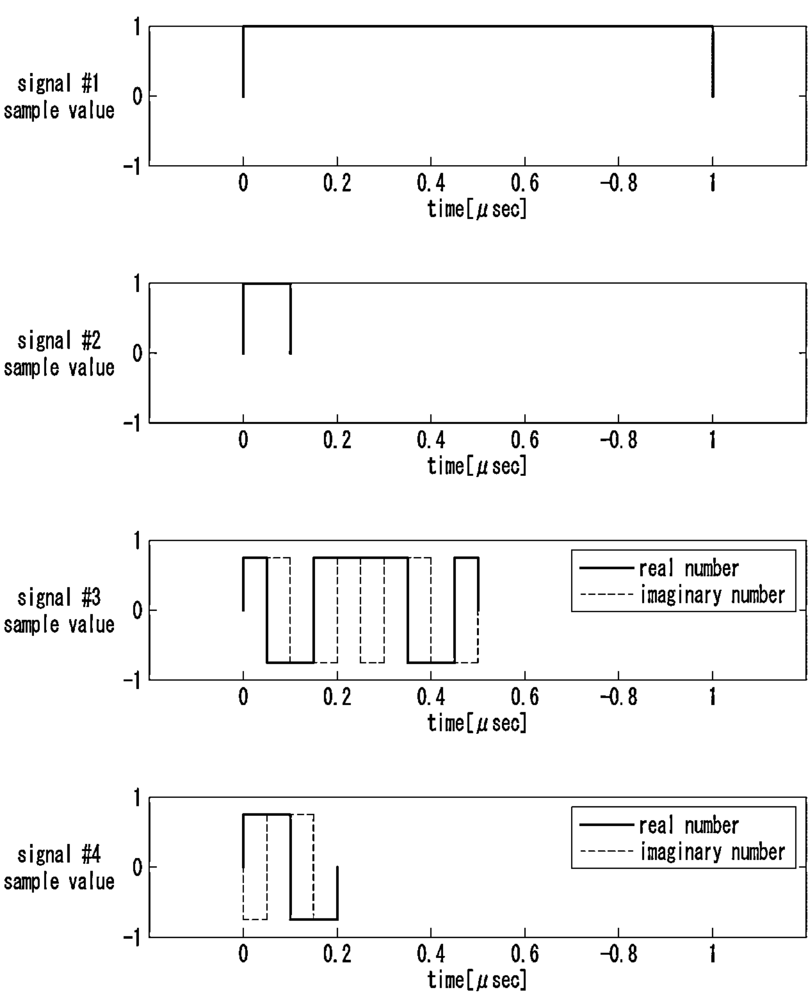
FIG. 30 is a waveform diagram showing a ninth exemplary embodiment of input signals used in a satellite navigation signal generation device.

FIG. 30 is a waveform diagram showing a ninth exemplary embodiment of input signals used in a satellite navigation signal generation device.

Referring to FIG. 30, input signals used in the satellite navigation signal generation device may include four signals such as a BPSK (1) (signal #1), BPSK (10) (signal #2), BOC (2,2) (signal #3), and BOC (10,5) (signal #4) in the L6 band. In this case, the signal #3 using BOC (2,2) and the signal #4 using BOC (10,5) may have an orthogonal phase relationship. Accordingly, the lowest common multiple of sample frequencies of the four signals may be 20.46 MHz. The satellite navigation signal generation device may apply a carrier frequency offset of 5.115 MHz to the signal #3 according to Equation 4. In addition, the satellite navigation signal generation device may apply a carrier frequency offset of −5.115 MHz to signal #4 according to Equation 4. In this case, the satellite navigation signal generation device may obtain chip pulse waveforms of the signal #3 and signal #4 as shown in FIG. 30.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a satellite navigation signal generation device, comprising:

receiving a plurality of signals;

assigning carrier frequency offset(s) to at least one pair of signals among the plurality of signals; and generating a constant envelope multiplexed signal for the plurality of signals including the at least one pair of signals to which the carrier frequency offset(s) are assigned, wherein the assigning of the carrier frequency offset(s) comprises:

switching the at least one pair of signals among the plurality of signals between an in-phase channel and a quadrature-phase channel according to a change in a sample period; and sign-inverting the at least one pair of signals switched to the in-phase channel or the quadrature-phase channel.

2. The method according to claim 1, wherein the at least one pair of signals includes a first signal and a second signal, the first signal and the second signal being quadrature signals with each other.

3. The method according to claim 1, wherein in the assigning of the carrier frequency offset(s), the carrier frequency offset(s) are assigned on a sample period basis.

4. The method according to claim 3, wherein the carrier frequency offset is ±fs/4 when fs is a sample frequency.

5. The method according to claim 1, wherein the switching of the at least one pair of signals comprises:

allowing a sample switch of the satellite navigation signal generation device to output a first signal of the at least one pair of signals from a first input terminal to a first output terminal during each odd-numbered sample period starting from a first sample period;

allowing the sample switch to output a second signal of the at least one pair of signals from a second input terminal to a second output terminal during each odd-numbered sample period starting from the first sample period;

allowing the sample switch to output the first signal of the at least one pair of signals from the first input terminal to the second output terminal during each even-numbered sample period; and allowing the sample switch to output the second signal of the at least one pair of signals from the second input terminal to the first output terminal during each even-numbered sample period.

6. The method according to claim 1, wherein the sign-inverting of the at least one pair of signals switched to the in-phase channel or the quadrature-phase channel comprises:

multiplying a first signal from the at least one pair of signals switched to the in-phase channel or the quadrature-phase channel by a first sign inversion pattern or a third sign inversion pattern, and outputting a result; and multiplying a second signal from the at least one pair of signals switched to the in-phase channel or the quadrature-phase channel by a second sign inversion pattern or a fourth sign inversion pattern, and outputting a result.

7. The method according to claim 1, wherein:

the first sign inversion pattern signal sequentially has values of [+1, −1, −1, +1] during respective sample periods from first to fourth sample periods, the second sign inversion pattern signal sequentially has values of [+1, +1, −1, −1] during the respective sample periods from the first to fourth sample periods, the third sign inversion pattern signal sequentially has values of [+1, +1, −1, −1] during the respective sample periods from the first to fourth sample periods, and the fourth sign inversion pattern signal sequentially has values of [+1, −1, −1, +1] during the respective sample periods from the first to fourth sample period.

8. A method of a satellite navigation signal generation device, comprising:

receiving a plurality of signals;

assigning carrier frequency offset(s) to at least one pair of signals among the plurality of signals; and generating a constant envelope multiplexed signal for the plurality of signals including the at least one pair of signals to which the carrier frequency offset(s) are assigned, wherein the assigning of the carrier frequency offset(s) comprises:

sign-inverting the at least one pair of signals; and switching the sign-inverted at least one pair of signals between an in-phase channel and a quadrature-phase channel according to a change in a sample period.

9. The method according to claim 8, wherein the sign-inverting of the at least one pair of signals comprises:

multiplying a first signal from the at least one pair of signals by a first sign inversion pattern or a third sign inversion pattern, and outputting a result; and multiplying a second signal of the at least one pair of signals by a second sign inversion pattern or a fourth sign inversion pattern, and outputting a result.

10. The method according to claim 9, wherein the first sign inversion pattern signal sequentially has values of [+1, +1, −1, −1] during respective sample periods from first to fourth sample periods, the second sign inversion pattern signal sequentially has values of [+1, −1, −1, +1] during the respective sample periods from the first to fourth sample periods, the third sign inversion pattern signal sequentially has values of [+1, −1, −1, +1] during the respective sample periods from the first to fourth sample periods, and the fourth sign inversion pattern signal sequentially has values of [+1, +1, −1, −1] during the respective sample periods from the first to fourth sample periods.

11. The method according to claim 8, wherein the switching of the sign-inverted at least one pair of signals between the in-phase channel and the quadrature-phase channel according to a change in a sample period comprises:

allowing a sample switch of the satellite navigation signal generation device to output a first signal of the sign-inverted at least one pair of signals from a first input terminal to a first output terminal during each odd-numbered sample period starting from a first sample period;

allowing the sample switch to output a second signal of the sign-inverted at least one pair of signals from a second input terminal to a second output terminal during each odd-numbered sample period starting from the first sample period;

allowing the sample switch to output the first signal of the sign-inverted at least one pair of signals from the first input terminal to the second output terminal during each even-numbered sample period; and allowing the sample switch to output the second signal of the sign-inverted at least one pair of signals from the second input terminal to the first output terminal during each even-numbered sample period.

12. A device for generating a satellite navigation signal, comprising a processor, wherein the processor causes the device to perform:

receiving a plurality of signals;

assigning carrier frequency offset(s) to at least one pair of signals among the plurality of signals; and generating a constant envelope multiplexed signal for the plurality of signals including the at least one pair of signals to which the carrier frequency offset(s) are assigned, wherein in the assigning of the carrier frequency offset(s), the processor causes the device to perform:

switching the at least one pair of signals among the plurality of signals between an in-phase channel and a quadrature-phase channel according to a change in a sample period; and sign-inverting the at least one pair of signals switched to the in-phase channel or the quadrature-phase channel.

13. The device according to claim 12, wherein the at least one pair of signals includes a first signal and a second signal, the first signal and the second signal being quadrature signals with each other.

14. The device according to claim 12, wherein in the assigning of the carrier frequency offset(s), the carrier frequency offset(s) are assigned on a sample period basis.

15. The device according to claim 14, wherein the carrier frequency offset is ±fs/4 when fs is a sample frequency.

16. The device according to claim 12, wherein in the sign-inverting of the at least one pair of signals switched to the in-phase channel or the quadrature-phase channel, the processor causes the device to perform:

multiplying a first signal from the at least one pair of signals switched to the in-phase channel or the quadrature-phase channel by a first sign inversion pattern or a third sign inversion pattern, and outputting a result; and multiplying a second signal from the at least one pair of signals switched to the in-phase channel or the quadrature-phase channel by a second sign inversion pattern or a fourth sign inversion pattern, and outputting a result.

* * * * *